(12) United States Patent
Kawamori et al.

(10) Patent No.: US 8,503,270 B1
(45) Date of Patent: Aug. 6, 2013

(54) THERMALLY-ASSISTED MAGNETIC RECORDING HEAD INCLUDING A PLASMON GENERATOR AND A MAGNETIC POLE

(75) Inventors: Keita Kawamori, Tokyo (JP); Kei Hirata, Tokyo (JP); Tetsuya Roppongi, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 13/456,734

(22) Filed: Apr. 26, 2012

(51) Int. Cl.
*G11B 11/00* (2006.01)
*G11B 5/02* (2006.01)

(52) U.S. Cl.
USPC ......................................... 369/13.33; 360/59

(58) Field of Classification Search
USPC .......... 369/13.33, 13.24, 13.12, 13.13, 13.32, 369/13.02; 360/59; 385/31, 48
See application file for complete search history.

(56) References Cited

U.S. PATENT DOCUMENTS

| | | | |
|---|---|---|---|
| 8,077,559 B1* | 12/2011 | Miyauchi et al. | 369/13.33 |
| 8,351,308 B2* | 1/2013 | Chou et al. | 369/13.33 |
| 2011/0170381 A1 | 7/2011 | Matsumoto | |

* cited by examiner

*Primary Examiner* — Nabil Hindi
(74) *Attorney, Agent, or Firm* — Oliff & Berridge, PLC

(57) ABSTRACT

A thermally-assisted magnetic recording head includes a magnetic pole, a waveguide, and a plasmon generator. The plasmon generator and the magnetic pole are disposed to align in the direction of travel of a magnetic recording medium. The thermally-assisted magnetic recording head further includes an amorphous layer made of a nonmagnetic metal, the amorphous layer being interposed between and in contact with the plasmon generator and the magnetic pole.

16 Claims, 12 Drawing Sheets

THERMALLY-ASSISTED MAGNETIC RECORDING HEAD INCLUDING A PLASMON GENERATOR AND A MAGNETIC POLE

BACKGROUND OF THE INVENTION

1. Field of the Invention

The present invention relates to a thermally-assisted magnetic recording head including a plasmon generator and a magnetic pole.

2. Description of the Related Art

Recently, magnetic recording devices such as magnetic disk drives have been improved in recording density, and thin-film magnetic heads and magnetic recording media of improved performance have been demanded accordingly. Among the thin-film magnetic heads, a composite thin-film magnetic head has been used widely. The composite thin-film magnetic head has such a structure that a read head section including a magnetoresistive element (hereinafter, also referred to as MR element) for reading and a write head section including an induction-type electromagnetic transducer for writing are stacked on a substrate. In a magnetic disk drive, the thin-film magnetic head is mounted on a slider that flies slightly above the surface of the magnetic recording medium.

To increase the recording density of a magnetic recording device, it is effective to make the magnetic fine particles of the magnetic recording medium smaller. Making the magnetic fine particles smaller, however, causes the problem that the magnetic fine particles drop in the thermal stability of magnetization. To solve this problem, it is effective to increase the anisotropic energy of the magnetic fine particles. However, increasing the anisotropic energy of the magnetic fine particles leads to an increase in coercivity of the magnetic recording medium, and this makes it difficult to perform data writing with existing magnetic heads.

To solve the aforementioned problems, there has been proposed a technology so-called thermally-assisted magnetic recording. The technology uses a magnetic recording medium having high coercivity. When writing data, a write magnetic field and heat are applied almost simultaneously to the area of the magnetic recording medium where to write data, so that the area rises in temperature and drops in coercivity for data writing. The area where data is written subsequently falls in temperature and rises in coercivity to increase the thermal stability of magnetization. Hereinafter, a magnetic head for use in thermally-assisted magnetic recording will be referred to as a thermally-assisted magnetic recording head.

In thermally-assisted magnetic recording, near-field light is typically used as a means for applying heat to the magnetic recording medium. A known method for generating near-field light is to use a plasmon generator, which is a piece of metal that generates near-field light from plasmons excited by irradiation with light. The light for use in generating near-field light is typically guided through a waveguide, which is provided in the slider, to the plasmon generator disposed near a medium facing surface of the slider.

U.S. Patent Application Publication No. 2011/0170381 A1 discloses a technology in which the surface of the core of the waveguide and the surface of the plasmon generator (metallic structure) are arranged to face each other with a gap therebetween, so that evanescent light that occurs from the surface of the core based on the light propagating through the core is used to excite surface plasmons on the plasmon generator to generate near-field light based on the excited surface plasmons.

A thermally-assisted magnetic recording head that employs a plasmon generator as a source of generation of near-field light is configured so that the write head section includes the plasmon generator and a magnetic pole that produces a write magnetic field. The plasmon generator and the magnetic pole are located in close proximity to each other. Now, a description will be made as to the problems with the thermally-assisted magnetic recording head having such a configuration.

Part of the energy of the light guided to the plasmon generator through the waveguide is transformed into heat in the plasmon generator. The plasmon generator, and the magnetic pole located in its vicinity, therefore increase in temperature during the operation of the thermally-assisted magnetic recording head.

Now, a case will be contemplated where the plasmon generator and the magnetic pole are in contact with each other. In this case, as the plasmon generator and the magnetic pole increase in temperature as mentioned above, a noticeable diffusion of substance tends to occur in the plasmon generator and the magnetic pole, causing the materials forming the plasmon generator and the magnetic pole to be diffused into each other. Such interdiffusion may cause the plasmon generator to be reduced in efficiency of transformation of the light that has been guided to the plasmon generator through the waveguide into near-field light. Furthermore, the magnetic pole may also deteriorate in magnetic property, and this may lead to degradation of the characteristics of the write head section.

U.S. Patent Application Publication No. 2011/0170381 A1 discloses a structure in which the plasmon generator and the magnetic pole are not in contact with each other and the plasmon generator is surrounded with a dielectric material. In this structure, the dielectric material is interposed between the plasmon generator and the magnetic pole. However, the adhesion between the plasmon generator and the dielectric material and that between the magnetic pole and the dielectric material are low in this structure. Consequently, in the process of manufacturing the thermally-assisted magnetic recording head or when the plasmon generator and the magnetic pole increase in temperature as mentioned above, there may occur a separation between the plasmon generator and the dielectric material and/or between the magnetic pole and the dielectric material.

OBJECT AND SUMMARY OF THE INVENTION

It is an object of the present invention to provide a thermally-assisted magnetic recording head including a plasmon generator and a magnetic pole and capable of preventing interdiffusion between the material forming the plasmon generator and the material forming the magnetic pole, and to provide a head gimbal assembly and a magnetic recording device that each include the thermally-assisted magnetic recording head.

Thermally-assisted magnetic recording heads of first and second aspects of the present invention each include: a medium facing surface that faces a magnetic recording medium; a magnetic pole; a waveguide; and a plasmon generator. The magnetic pole has an end face located in the medium facing surface and produces a write magnetic field for writing data on the magnetic recording medium. The waveguide includes a core and a cladding, the core allowing light to propagate therethrough. The plasmon generator has a near-field light generating part located in the medium facing surface, and is configured so that a surface plasmon is excited on the plasmon generator based on the light propagating through the core and the near-field light generating part generates near-field light based on the surface plasmon. The plasmon generator and the magnetic pole are disposed to align in the direction of travel of the magnetic recording medium.

The thermally-assisted magnetic recording head of the first aspect of the present invention further includes an amorphous layer made of a nonmagnetic metal, the amorphous layer being interposed between and in contact with the plasmon generator and the magnetic pole.

In the thermally-assisted magnetic recording head of the second aspect of the present invention, the magnetic pole has a contact surface in contact with the plasmon generator, and all or a part of the magnetic pole including the contact surface is made of an amorphous magnetic metal.

In each of the thermally-assisted magnetic recording heads of the first and second aspects of the present invention, the core may have an evanescent light generating surface that generates evanescent light based on the light propagating through the core, and the plasmon generator may have a plasmon exciting part that faces the evanescent light generating surface with a predetermined spacing therebetween. In this case, the plasmon generator is configured so that a surface plasmon is excited on the plasmon exciting part through coupling with the evanescent light generated from the evanescent light generating surface, the surface plasmon propagates to the near-field light generating part, and the near-field light generating part generates the near-field light based on the surface plasmon.

In each of the thermally-assisted magnetic recording heads of the first and second aspects of the present invention, the magnetic pole may be located on the front side in the direction of travel of the magnetic recording medium relative to the plasmon generator. The plasmon generator may have a front end face located in the medium facing surface. The front end face may include a first portion and a second portion connected to each other into a V-shape. In this case, the end face of the magnetic pole may include a portion enclosed by the first and second portions of the front end face.

A head gimbal assembly of the first aspect of the present invention includes the thermally-assisted magnetic recording head of the first aspect of the present invention, and a suspension that supports this thermally-assisted magnetic recording head. A head gimbal assembly of the second aspect of the present invention includes the thermally-assisted magnetic recording head of the second aspect of the present invention, and a suspension that supports this thermally-assisted magnetic recording head.

A magnetic recording device of the first aspect of the present invention includes a magnetic recording medium, the thermally-assisted magnetic recording head of the first aspect of the present invention, and a positioning device that supports this thermally-assisted magnetic recording head and positions the same with respect to the magnetic recording medium. A magnetic recording device of the second aspect of the present invention includes a magnetic recording medium, the thermally-assisted magnetic recording head of the second aspect of the present invention, and a positioning device that supports this thermally-assisted magnetic recording head and positions the same with respect to the magnetic recording medium.

A magnetic recording device of a third aspect of the present invention includes a magnetic recording medium having a track which is an area on which data is to be written, and a thermally-assisted magnetic recording head for writing the data on the magnetic recording medium. The thermally-assisted magnetic recording head includes: a medium facing surface that faces the magnetic recording medium; a magnetic pole; a waveguide; and a plasmon generator. The magnetic pole has an end face located in the medium facing surface and produces a write magnetic field for writing the data on the magnetic recording medium. The waveguide includes a core and a cladding, the core allowing light to propagate therethrough. The plasmon generator has a near-field light generating part located in the medium facing surface, and is configured so that a surface plasmon is excited on the plasmon generator based on the light propagating through the core and the near-field light generating part generates near-field light based on the surface plasmon. The plasmon generator and the magnetic pole are disposed to align in the direction of travel of the magnetic recording medium.

In the magnetic recording device of the third aspect of the present invention, the magnetic pole has a contact surface in contact with the plasmon generator, and all or a part of the magnetic pole including the contact surface has a grain size greater than an effective track width of the track.

In the magnetic recording device of the third aspect of the present invention, the core may have an evanescent light generating surface that generates evanescent light based on the light propagating through the core, and the plasmon generator may have a plasmon exciting part that faces the evanescent light generating surface with a predetermined spacing therebetween. In this case, the plasmon generator is configured so that a surface plasmon is excited on the plasmon exciting part through coupling with the evanescent light generated from the evanescent light generating surface, the surface plasmon propagates to the near-field light generating part, and the near-field light generating part generates the near-field light based on the surface plasmon.

In the magnetic recording device of the third aspect of the present invention, the magnetic pole may be located on the front side in the direction of travel of the magnetic recording medium relative to the plasmon generator. The plasmon generator may have a front end face located in the medium facing surface. The front end face may include a first portion and a second portion connected to each other into a V-shape. In this case, the end face of the magnetic pole may include a portion enclosed by the first and second portions of the front end face.

According to the thermally-assisted magnetic recording head, the head gimbal assembly and the magnetic recording device of the first aspect of the present invention, since the amorphous layer made of a nonmagnetic metal is interposed between and in contact with the plasmon generator and the magnetic pole, it is possible to prevent interdiffusion between the material forming the plasmon generator and the material forming the magnetic pole.

According to the thermally-assisted magnetic recording head, the head gimbal assembly and the magnetic recording device of the second aspect of the present invention, since all or a part of the magnetic pole including the contact surface in contact with the plasmon generator is made of an amorphous magnetic metal, it is possible to prevent interdiffusion between the material forming the plasmon generator and the material forming the magnetic pole.

According to the magnetic recording device of the third aspect of the present invention, since all or a part of the magnetic pole including the contact surface in contact with the plasmon generator has a grain size greater than the effective track width of the track, it is possible to prevent interdiffusion between the material forming the plasmon generator and the material forming the magnetic pole.

Other and further objects, features and advantages of the present invention will appear more fully from the following description.

DETAILED DESCRIPTION OF THE PREFERRED EMBODIMENTS

First Embodiment

Figure 4:
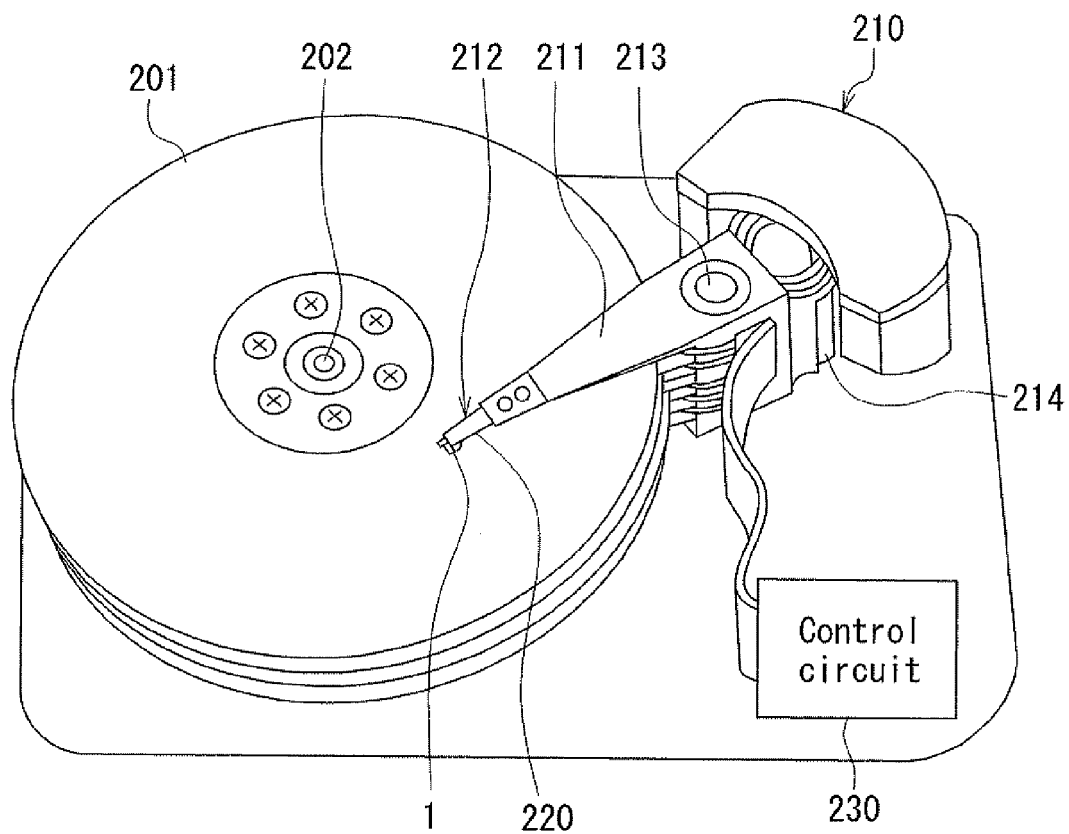
FIG. 4 is a perspective view showing a magnetic recording device according to the first embodiment of the invention.

Preferred embodiments of the present invention will now be described in detail with reference to the drawings. First, reference is made to FIG. 4 to describe a magnetic disk drive that functions as a magnetic recording device according to a first embodiment of the invention. As shown in FIG. 4, the magnetic disk drive includes a plurality of magnetic disks 201 serving as a plurality of magnetic recording media, and a spindle motor 202 for rotating the magnetic disks 201. The magnetic disks 201 of the present embodiment are for use in perpendicular magnetic recording. Each magnetic disk 201 has such a structure that a soft magnetic under layer, a middle layer, and a magnetic recording layer (perpendicular magnetization layer) are stacked in this order on a disk substrate.

The magnetic disk drive further includes an assembly carriage device 210 having a plurality of driving arms 211, and a plurality of head gimbal assemblies 212 attached to respective distal ends of the driving arms 211. Each head gimbal assembly 212 includes a thermally-assisted magnetic recording head 1 according to the present embodiment, and a suspension 220 that supports the thermally-assisted magnetic recording head 1.

The assembly carriage device 210 is a device for positioning the thermally-assisted magnetic recording heads 1 on tracks which are concentrically formed in the magnetic recording layer of each magnetic disk 201. The tracks are the area of the magnetic recording layer on which data is to be written. Each track is provided with a plurality of record bits formed in a row. The assembly carriage device 210 further has a pivot bearing shaft 213 and a voice coil motor 214. The plurality of driving arms 211 are stacked in a direction along the pivot bearing shaft 213 and are pivotable about the shaft 213 by being driven by the voice coil motor 214. The magnetic recording device of the present invention is not structurally limited to the magnetic disk drive having the above-described configuration. For example, the magnetic recording device of the present invention may be provided with a single magnetic disk 201, a single driving arm 211, a single head gimbal assembly 212 and a single thermally-assisted magnetic recording head 1.

The magnetic disk drive further includes a control circuit 230 that controls the read/write operations of the thermally-assisted magnetic recording heads 1 and also controls the light emitting operation of a laser diode serving as a light source for generating laser light for thermally-assisted magnetic recording described later.

Figure 5:
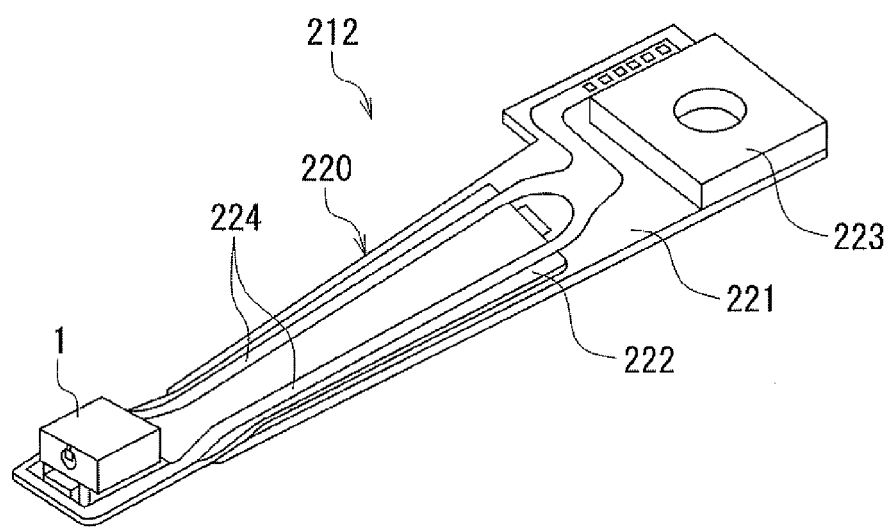
FIG. 5 is a perspective view showing a head gimbal assembly according to the first embodiment of the invention.

FIG. 5 is a perspective view showing the head gimbal assembly 212 of FIG. 4. As described above, the head gimbal assembly 212 includes the thermally-assisted magnetic recording head 1 and the suspension 220. The suspension 220 has a load beam 221, a flexure 222 secured to the load beam 221 and having flexibility, a base plate 223 provided at the base part of the load beam 221, and a wiring member 224 provided on the load beam 221 and the flexure 222. The wiring member 224 includes a plurality of leads. The thermally-assisted magnetic recording head 1 is secured to the flexure 222 at the distal end of the suspension 220 such that the head 1 faces the surface of the magnetic disk 201 with a predetermined spacing (flying height). One end of the wiring member 224 is electrically connected to a plurality of terminals of the thermally-assisted magnetic recording head 1. The other end of the wiring member 224 is provided with a plurality of pad-shaped terminals arranged at the base part of the load beam 221.

The assembly carriage device 210 and the suspension 220 correspond to the positioning device of the present invention. The head gimbal assembly of the present invention is not limited to one having the configuration shown in FIG. 5. For example, the head gimbal assembly of the present invention may have an IC chip for driving the head that is mounted somewhere along the suspension 220.

Figure 6:
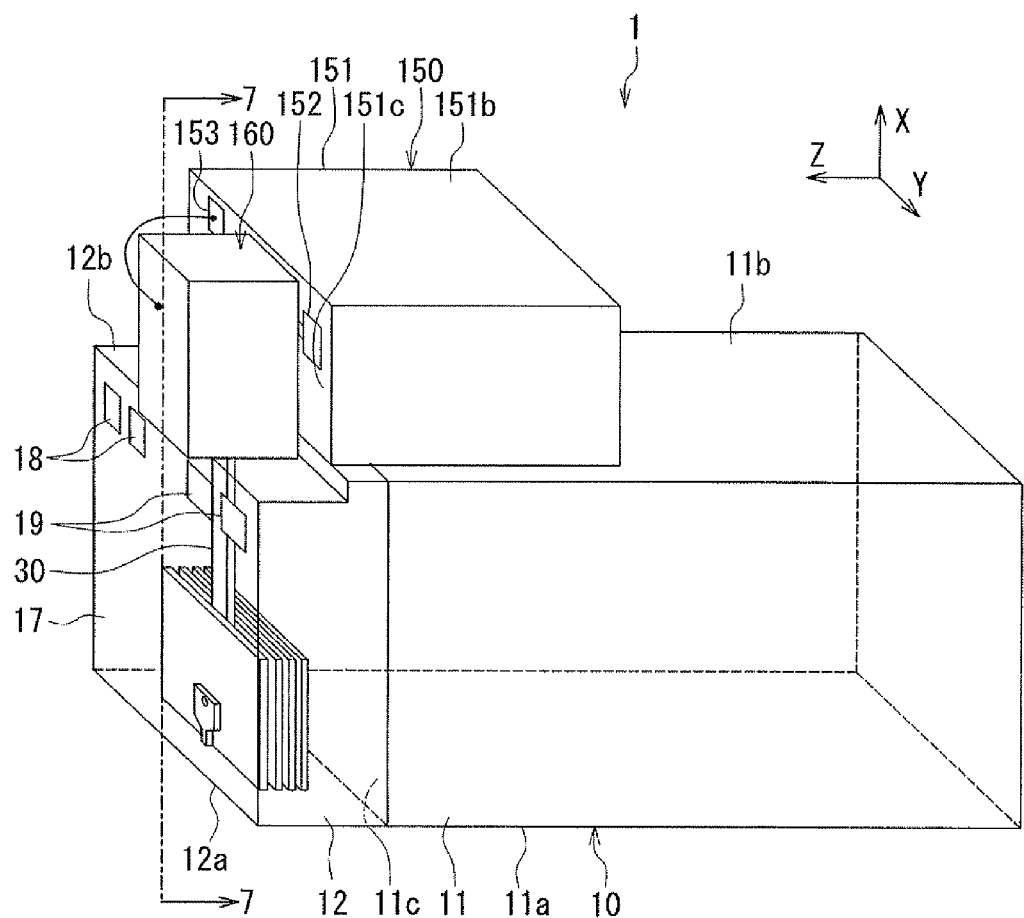
FIG. 6 is a perspective view showing the thermally-assisted magnetic recording head according to the first embodiment of the invention.
Figure 7:
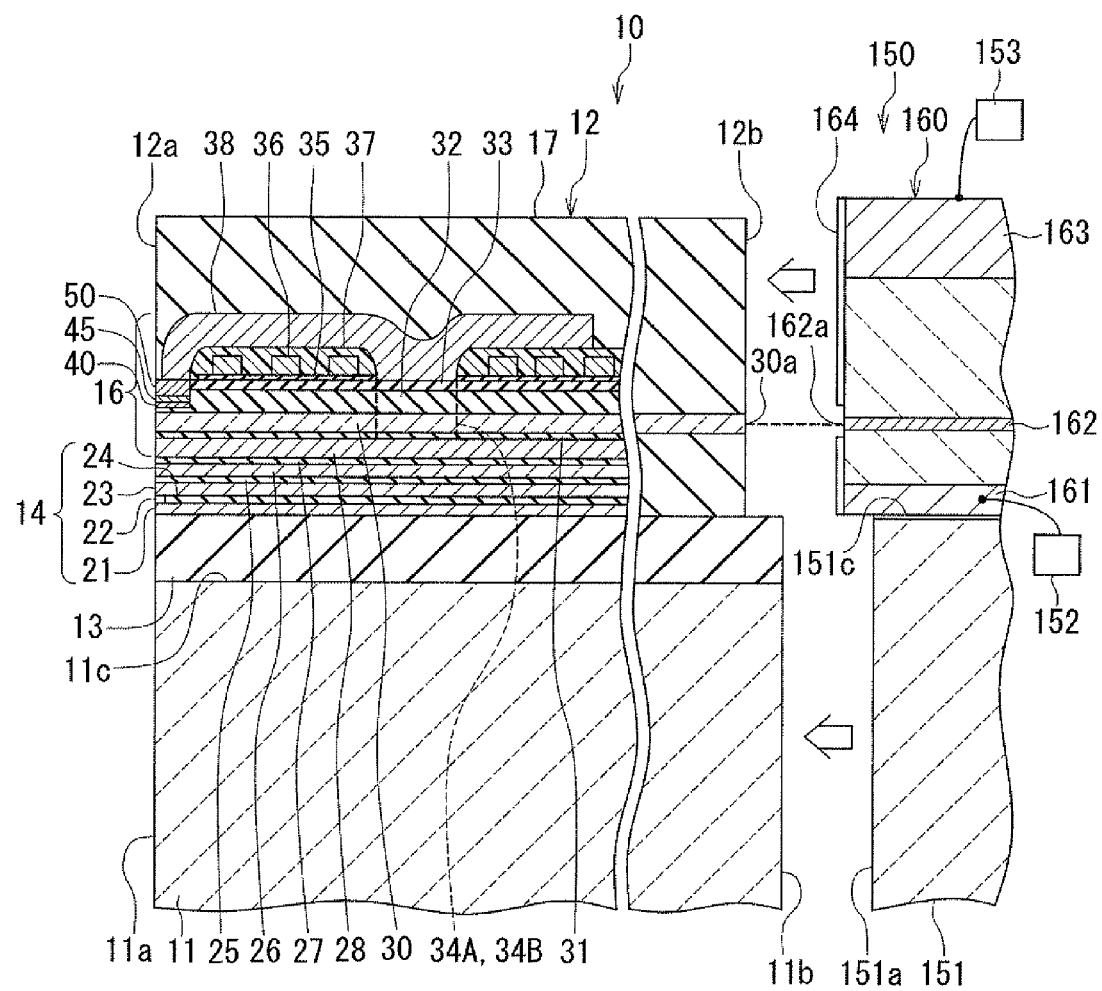
FIG. 7 shows a cross section taken along line 7-7 of FIG. 6.

The configuration of the thermally-assisted magnetic recording head 1 according to the present embodiment will now be described with reference to FIG. 6 and FIG. 7. FIG. 6 is a perspective view showing the thermally-assisted magnetic recording head 1. FIG. 7 shows a cross section taken along line 7-7 of FIG. 6. The thermally-assisted magnetic recording head 1 includes a slider 10 and a light source unit 150. FIG. 7 shows a state where the slider 10 and the light source unit 150 are separated from each other.

The slider 10 includes a slider substrate 11 and a head section 12. The slider substrate 11 is in the shape of a rectangular solid and is made of a ceramic material such as aluminum oxide-titanium carbide ($Al_2O_3$—TiC). The slider substrate 11 has a medium facing surface 11a that faces the magnetic disk 201, a rear surface 11b opposite to the medium facing surface 11a, and four surfaces connecting the medium facing surface 11a to the rear surface 11b. One of the four surfaces connecting the medium facing surface 11a to the rear surface 11b is an element-forming surface 11c. The element-forming surface 11c is perpendicular to the medium facing surface 11a. The head section 12 is disposed on the element-forming surface 11c. The medium facing surface 11a is processed so as to obtain an appropriate flying height of the slider 10 from the magnetic disk 201. The head section 12 has a medium facing surface 12a that faces the magnetic disk 201, and a rear surface 12b opposite to the medium facing surface 12a. The medium facing surface 12a is parallel to the medium facing surface 11a of the slider substrate 11.

Where the components of the head section 12 are concerned, with respect to a reference position, a position located in a direction that extends perpendicular to the element-forming surface 11c and away from the element-forming surface 11c is defined as "above", and a position located in a direction opposite to the aforementioned direction is defined as "below". Where the layers included in the head section 12 are concerned, the surface closer to the element-forming surface 11c is defined as a "bottom surface," and the surface farther from the element-forming surface 11c is defined as a "top surface."

Moreover, X direction, Y direction, Z direction, -X direction, -Y direction, and -Z direction will be defined as follows. The X direction is a direction perpendicular to the medium facing surface 11a and from the medium facing surface 11a to the rear surface 11b. The Y direction is a direction parallel to the medium facing surface 11a and the element-forming surface 11c and from the back side to the front side of FIG. 7. The Z direction is a direction that extends perpendicular to the element-forming surface 11c and away from the element-forming surface 11c. The -X direction, the -Y direction, and the -Z direction are opposite to the X direction, the Y direction, and the Z direction, respectively. As viewed from the slider 10, the magnetic disk 201 travels in the Z direction. The slider 10 has an air inflow end (a leading end) at the end of the medium facing surface 11a in the -Z direction. The slider 10 has an air outflow end (a trailing end) at the end of the medium facing surface 12a in the Z direction. Track width direction TW is parallel to the Y direction.

The light source unit 150 includes a laser diode 160 serving as a light source for emitting laser light, and a support member 151 that is in the shape of a rectangular solid and supports the laser diode 160. The support member 151 is made of, for example, a ceramic material such as aluminum oxide-titanium carbide ($Al_2O_3$—TiC). The support member 151 has a bond surface 151a, a rear surface 151b opposite to the bond surface 151a, and four surfaces connecting the bond surface 151a to the rear surface 151b. One of the four surfaces connecting the bond surface 151a to the rear surface 151b is a light source mount surface 151c. The bond surface 151a is the surface to be bonded to the rear surface 11b of the slider substrate 11. The light source mount surface 151c is perpendicular to the bond surface 151a and parallel to the element-forming surface 11c. The laser diode 160 is mounted on the light source mount surface 151c. The support member 151 may function as a heat sink for dissipating heat generated by the laser diode 160, as well as serving to support the laser diode 160.

As shown in FIG. 7, the head section 12 includes an insulating layer 13 disposed on the element-forming surface 11c, and also includes a read head section 14, a write head section 16 and a protective layer 17 that are stacked in this order on the insulating layer 13. The insulating layer 13 and the protective layer 17 are each made of an insulating material such as $Al_2O_3$ (hereinafter, also referred to as alumina).

The read head section 14 includes: a bottom shield layer 21 disposed on the insulating layer 13; an MR element 22 disposed on the bottom shield layer 21; a top shield layer 23 disposed on the MR element 22; and an insulating layer 24 disposed between the bottom shield layer 21 and the top shield layer 23 and surrounding the MR element 22. The bottom shield layer 21 and the top shield layer 23 are each made of a soft magnetic material. The insulating layer 24 is made of an insulating material such as alumina.

An end of the MR element 22 is located in the medium facing surface 12a. The MR element may be a giant magnetoresistive (GMR) element or a tunneling magnetoresistive (TMR) element, for example. The GMR element may be of either the current-in-plane (CIP) type in which a sense current for use in magnetic signal detection is fed in a direction generally parallel to the plane of layers constituting the GMR element or the current-perpendicular-to-plane (CPP) type in which the sense current is fed in a direction generally perpendicular to the plane of layers constituting the GMR element. If the MR element 22 is a TMR element or a CPP-type GMR element, the bottom shield layer 21 and the top shield layer 23 may also serve as electrodes for feeding the sense current to the MR element 22. If the MR element 22 is a CIP-type GMR element, insulating films are respectively provided between the MR element 22 and the bottom shield layer 21 and between the MR element 22 and the top shield layer 23, and two leads are provided between these insulating films in order to feed the sense current to the MR element 22.

The head section 12 further includes an insulating layer 25 disposed on the top shield layer 23, a middle shield layer 26 disposed on the insulating layer 25, and an insulating layer 27 disposed on the middle shield layer 26. The middle shield layer 26 has the function of shielding the MR element 22 from a magnetic field produced in the write head section 16. The insulating layers 25 and 27 are each made of an insulating material such as alumina. The middle shield layer 26 is made of a soft magnetic material. The insulating layer 25 and the middle shield layer 26 may be omitted.

The write head section 16 is for use in perpendicular magnetic recording. The write head section 16 includes a return yoke layer 28 disposed on the insulating layer 27, and a not-shown insulating layer disposed on the insulating layer 27 and surrounding the return yoke layer 28. The return yoke layer 28 is made of a soft magnetic material. The return yoke layer 28 has an end face located in the medium facing surface 12a. The top surfaces of the return yoke layer 28 and the not-shown insulating layer are even with each other.

The write head section 16 further includes a waveguide including a core 30 and a cladding. The cladding includes cladding layers 31 and 32. The cladding layer 31 is disposed over the return yoke layer 28 and the not-shown insulating layer. The core 30 is disposed on the cladding layer 31. The cladding layer 32 covers the cladding layer 31 and the core 30.

The core 30 extends in the direction perpendicular to the medium facing surface 12a (the X direction). The core 30 has an incidence end 30a, and a front end face opposite thereto. The core 30 allows laser light that is emitted from the laser diode 160 and incident on the incidence end 30a to propagate through.

The core 30 is made of a dielectric material that transmits the laser light. Each of the cladding layers 31 and 32 is made of a dielectric material and has a refractive index lower than that of the core 30. For example, if the laser light has a wavelength of 600 nm and the core 30 is made of $Al_2O_3$ (refractive index n=1.63), the cladding layers 31 and 32 may be made of SiO$_2$ (refractive index n=1.46). If the core 30 is made of tantalum oxide such as Ta$_2$O$_5$=2.16), the cladding layers 31 and 32 may be made of SiO$_2$ (n=1.46) or Al$_2$O$_3$ (n=1.63).

The write head section 16 further includes: a plasmon generator 40 disposed above the core 30 in the vicinity of the medium facing surface 12a; a magnetic pole 50 disposed such that the plasmon generator 40 is interposed between the core 30 and the magnetic pole 50; and an amorphous layer 45 interposed between and in contact with the plasmon generator 40 and the magnetic pole 50. The magnetic pole 50 has a top surface that is higher in level than the top surface of the cladding layer 32.

The plasmon generator 40 is made of a conductive material such as metal. For example, the plasmon generator 40 may be made of one element selected from the group consisting of Au, Ag, Cu, and Al, or of an alloy composed of two or more of these elements. The amorphous layer 45 is entirely made of a nonmagnetic metal and is entirely amorphous. The amorphous layer 45 may be made of Ta, for example. The magnetic pole 50 is made of a soft magnetic material, or a magnetic metal material in particular. The shapes and the arrangement of the plasmon generator 40, the amorphous layer 45 and the magnetic pole 50 will be detailed later.

The write head section 16 further includes an insulating layer 33 disposed on the cladding layer 32 and surrounding the magnetic pole 50, and two coupling portions 34A and 34B located away from the medium facing surface 12a and embedded in the cladding layers 31 and 32 and the insulating layer 33. The coupling portions 34A and 34B are made of a soft magnetic material. The coupling portions 34A and 34B are located on opposite sides of the core 30 in the track width direction TW and are each spaced from the core 30. The bottom surfaces of the coupling portions 34A and 34B are in contact with the top surface of the return yoke layer 28.

The write head section 16 further includes an insulating layer 35 disposed on the insulating layer 33, a coil 36 disposed on the insulating layer 35, and an insulating layer 37 covering the coil 36. The coil 36 is planar spiral-shaped and wound around the coupling portions 34A and 34B. The coil 36 produces a magnetic field corresponding to data to be written on the magnetic disk 201. The coil 36 is made of a conductive material such as copper.

The write head section 16 further includes a yoke layer 38. The yoke layer 38 is disposed over the magnetic pole 50, the insulating layer 37 and the coupling portions 34A and 34B. The yoke layer 38 is in contact with the top surface of the magnetic pole 50 at a position near the medium facing surface 12a, and in contact with the top surfaces of the coupling portions 34A and 34B at a position away from the medium facing surface 12a. The yoke layer 38 is made of a soft magnetic material.

In the write head section 16, a magnetic path for passing a magnetic flux corresponding to the magnetic field produced by the coil 36 is formed by the return yoke layer 28, the coupling portions 34A and 34B, the yoke layer 38, and the magnetic pole 50. The magnetic pole 50 has an end face located in the medium facing surface 12a. The magnetic pole 50 allows the magnetic flux corresponding to the magnetic field produced by the coil 36 to pass, and produces a write magnetic field for writing data on the magnetic disk 201.

As shown in FIG. 7, the protective layer 17 is disposed to cover the write head section 16. As shown in FIG. 6, the head section 12 further includes a pair of terminals 18 that are disposed on the top surface of the protective layer 17 and electrically connected to the MR element 22, and a pair of terminals 19 that are disposed on the top surface of the protective layer 17 and electrically connected to the coil 36. These terminals 18 and 19 are electrically connected to the plurality of pad-shaped terminals of the wiring member 224 shown in FIG. 5.

The laser diode 160 may be a laser diode of InP type, GaAs type, GaN type or the like that is commonly used for such applications as communications, optical disc storage and material analysis. The laser diode 160 may emit laser light of any wavelength within the range of, for example, 375 nm to 1.7 μm. Specifically, the laser diode 160 may be an InGaAsP/InP quarternary mixed crystal laser diode having an emittable wavelength range of 1.2 to 1.67 μm, for example.

As shown in FIG. 7, the laser diode 160 has a multilayer structure including a lower electrode 161, an active layer 162, and an upper electrode 163. A reflecting layer 164 made of, for example, SiO$_2$ or Al$_2$O$_3$, is formed on two cleavage planes of the multilayer structure so as to excite oscillation by total reflection of light. The reflecting layer 164 has an opening for emitting laser light in the position of the active layer 162 including an emission center 162a.

The light source unit 150 further includes a terminal 152 disposed on the light source mount surface 151c and electrically connected to the lower electrode 161, and a terminal 153 disposed on the light source mount surface 151c and electrically connected to the upper electrode 163. These terminals 152 and 153 are electrically connected to the plurality of pad-shaped terminals of the wiring member 224 shown in FIG. 5. When a predetermined voltage is applied to the laser diode 160 through the terminals 152 and 153, laser light is emitted from the emission center 162a of the laser diode 160. The laser light emitted from the laser diode 160 is preferably TM-mode polarized light whose electric field oscillates in a direction perpendicular to the plane of the active layer 162.

The laser diode 160 can be driven by a power supply inside the magnetic disk drive. The magnetic disk drive usually includes a power supply that generates a voltage of 5 V or so, for example. This supply voltage is sufficient to drive the laser diode 160. The laser diode 160 has a power consumption of, for example, several tens of milliwatts or so, which can be adequately covered by the power supply in the magnetic disk drive.

The light source unit 150 is secured to the slider 10 by bonding the bond surface 151a of the support member 151 to the rear surface 11b of the slider substrate 11, as shown in FIG. 7. The laser diode 160 and the core 30 are positioned with respect to each other so that the laser light emitted from the laser diode 160 will be incident on the incidence end 30a of the core 30.

Figure 1:
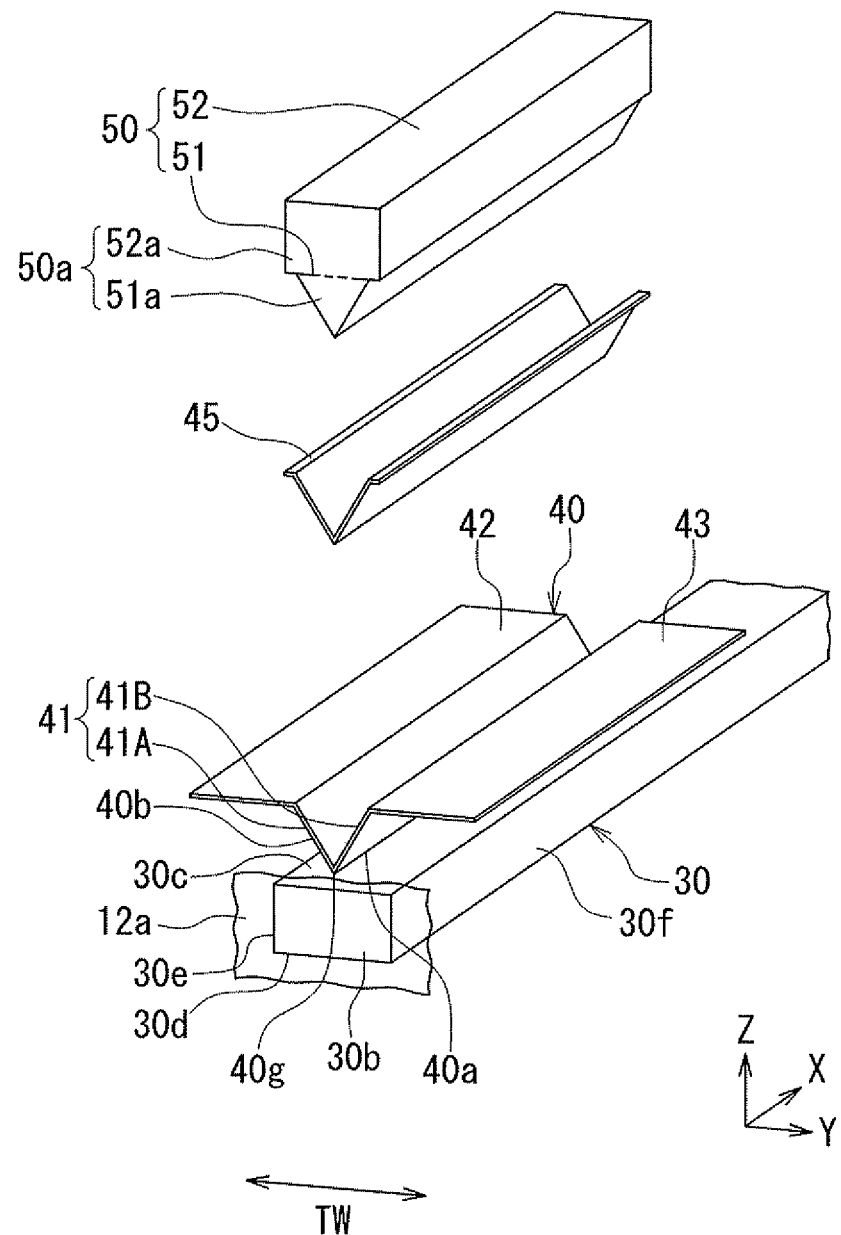
FIG. 1 is a perspective view showing the main part of a thermally-assisted magnetic recording head according to a first embodiment of the invention.
Figure 2:
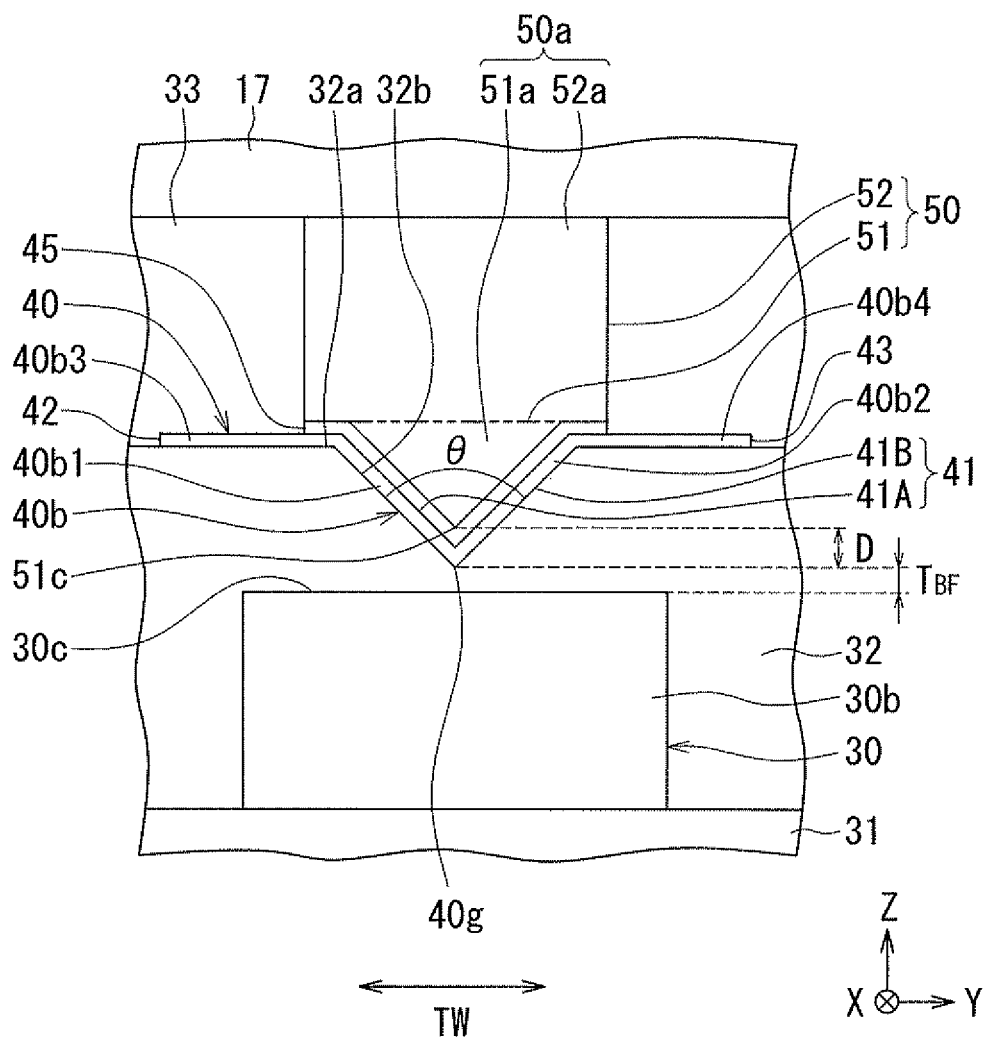
FIG. 2 is a front view showing the main part of the thermally-assisted magnetic recording head according to the first embodiment of the invention.
Figure 3:
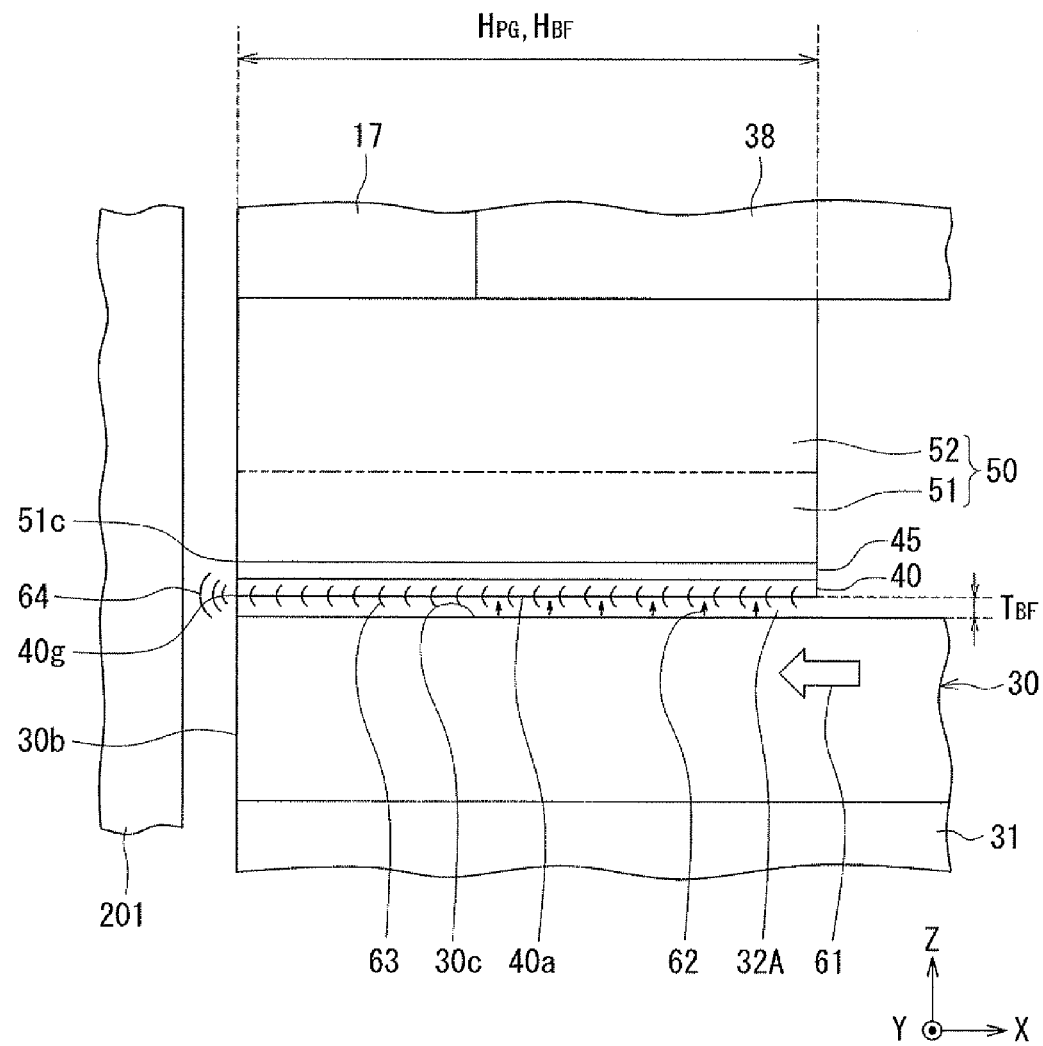
FIG. 3 is a cross-sectional view showing the main part of the thermally-assisted magnetic recording head according to the first embodiment of the invention.

The shapes and the arrangement of the core 30, the plasmon generator 40, the amorphous layer 45 and the magnetic pole 50 will now be described in detail with reference to FIG. 1 to FIG. 3. FIG. 1 is a perspective view showing the main part of the thermally-assisted magnetic recording head 1. FIG. 2 is a front view showing the main part of the thermally-assisted magnetic recording head 1. FIG. 2 shows part of the medium facing surface 12a. FIG. 3 is a cross-sectional view showing the main part of the thermally-assisted magnetic recording head 1. FIG. 3 shows a cross section perpendicular to the element-forming surface 11c and to the medium facing surface 12a.

The core 30 has the incidence end 30a shown in FIG. 7 and further has: a front end face 30b which is closer to the medium facing surface 12a; an evanescent light generating surface 30c which is a top surface; a bottom surface 30d; and two side surfaces 30e and 30f. FIG. 1 to FIG. 3 show an example in which the front end face 30b is located in the medium facing surface 12a; however, the front end face 30b may be located away from the medium facing surface 12a. The evanescent light generating surface 30c generates evanescent light based on the light propagating through the core 30. The evanescent light generating surface 30c is perpendicular to the Z direction. The core 30 is located on the rear side in the direction of travel of the magnetic disk 201 relative to the plasmon generator 40. A portion of the cladding layer 32 is interposed between the core 30 and the plasmon generator 40.

As shown in FIG. 2, the cladding layer 32 has a top surface 32a located above the core 30, and a groove 32b that opens in the top surface 32a and is located above the core 30. The groove 32b extends in the direction perpendicular to the medium facing surface 12a (the X direction). The groove 32b is V-shaped in cross section parallel to the medium facing surface 12a.

As shown in FIG. 1 to FIG. 3, the plasmon generator 40 includes a plasmon exciting part 40a and a front end face 40b. The plasmon exciting part 40a faces the evanescent light generating surface 30c of the core 30 with a predetermined spacing therebetween. The front end face 40b is located in the medium facing surface 12a. Surface plasmons are excited on the plasmon exciting part 40a through coupling with the evanescent light generated from the evanescent light generating surface 30c. The cladding layer 32 has a portion interposed between the evanescent light generating surface 30c and the plasmon exciting part 40a, and this portion of the cladding layer 32 forms, as shown in FIG. 3, a buffer part 32A having a refractive index lower than that of the core 30.

As shown in FIG. 1 and FIG. 2, the plasmon generator 40 has a V-shaped portion 41 which includes part of the front end face 40b and the plasmon exciting part 40a. The V-shaped portion 41 extends in the direction perpendicular to the medium facing surface 12a (the X direction). The groove 32b mentioned above is provided to accommodate the V-shaped portion 41.

The V-shaped portion 41 has a first sidewall portion 41A and a second sidewall portion 41B each connected to the plasmon exciting part 40a. The distance between the first and second sidewall portions 41A and 41B increases with increasing distance from the plasmon exciting part 40a. The first and second sidewall portions 41A and 41B are each shaped like a plate. The first and second sidewall portions 41A and 41B are connected to each other so that the connected first and second sidewall portions 41A and 41B have a V-shaped cross section parallel to the medium facing surface 12a. The plasmon exciting part 40a is formed of an edge of the connected first and second sidewall portions 41A and 41B, the edge being located at an end closest to the evanescent light generating surface 30c.

The plasmon generator 40 further has an extended portion 42 connected to an end of the first sidewall portion 41A opposite from the plasmon exciting part 40a, and an extended portion 43 connected to an end of the second sidewall portion 41B opposite from the plasmon exciting part 40a. From the end of the first sidewall portion 41A opposite from the plasmon exciting part 40a, the extended portion 42 extends parallel to the evanescent light generating surface 30c and away from both the first and second sidewall portions 41A and 41B (in the −Y direction). From the end of the second sidewall portion 41B opposite from the plasmon exciting part 40a, the extended portion 43 extends parallel to the evanescent light generating surface 30c and away from both the first and second sidewall portions 41A and 41B (in the Y direction). As viewed from above, the outer edges of the extended portions 42 and 43 lie outside the outer edges of the magnetic pole 50.

The front end face 40b includes: a first portion 40b1 and a second portion 40b2 lying at respective ends of the first and second sidewall portions 41A and 41B and connected to each other into a V-shape; a third portion 40b3 lying at an end of the extended portion 42; a fourth portion 40b4 lying at an end of the extended portion 43; and a near-field light generating part 40g lying at an end of the plasmon exciting part 40a. The near-field light generating part 40g generates near-field light based on the surface plasmons excited on the plasmon exciting part 40a.

The amorphous layer 45 has a predetermined thickness and extends along the V-shaped portion 41 and the extended portions 42 and 43 of the plasmon generator 40. The amorphous layer 45 includes a portion having approximately the same shape as the V-shaped portion 41. The thickness of the amorphous layer 45 is preferably in the range of 1 to 6 nm and more preferably in the range of 3 to 6 nm. The reason for this will be described in detail later.

The magnetic pole 50 includes a first portion 51 and a second portion 52. The first portion 51 is accommodated in the space defined by the portion of the amorphous layer 45 having approximately the same shape as the V-shaped portion 41. The second portion 52 is located farther from the evanescent light generating surface 30c of the core 30 than is the first portion 51. In FIG. 1 to FIG. 3, the boundary between the first portion 51 and the second portion 52 is shown by a chain double-dashed line.

The first portion 51 is triangular-prism-shaped, and is enclosed by the first and second sidewall portions 41A and 41B of the V-shaped portion 41 of the plasmon generator 40. The width of the first portion 51 in the direction parallel to the medium facing surface 12a and to the evanescent light generating surface 30c (the Y direction) is constant or almost constant regardless of the distance from the medium facing surface 12a.

The second portion 52 is rectangular-solid-shaped. The width of the second portion 52 in the direction parallel to the medium facing surface 12a and to the evanescent light generating surface 30c (the Y direction) is constant regardless of the distance from the medium facing surface 12a, and is greater than the width of the first portion 51. As viewed from above, the outer edges of the second portion 52 coincide with or lie close to the outer edges of the amorphous layer 45.

As shown in FIG. 1 and FIG. 2, the magnetic pole 50 has an end face 50a located in the medium facing surface 12a. The end face 50a includes a first portion 51a and a second portion 52a. The first portion 51a is the end face of the first portion 51. The second portion 52a is the end face of the enclosed by the first and second portions 40b1 and 40b2 of the front end face 40b of the plasmon generator 40. The first portion 51a has a tip 51c located at its bottom end.

As shown in FIG. 3, the length of the plasmon generator 40 in the X direction will be represented by the symbol $H_{PG}$. $H_{PG}$ falls within the range of 0.6 to 4.0 μm, for example. The length of a portion of the plasmon exciting part 40a in the X direction, the portion being opposed to the evanescent light generating surface 30c, will be represented by the symbol $H_{BF}$. The distance between the plasmon exciting part 40a and the evanescent light generating surface 30c will be represented by the symbol $T_{BF}$. Both $H_{BF}$ and $T_{BF}$ are important parameters in achieving appropriate excitation and propagation of surface plasmons. $H_{BF}$ falls within the range of 0.6 to 4.0 μm, for example. In the example shown in FIG. 3, $H_{BF}$ is equal to $H_{PG}$ since the front end face 30b of the core 30 is located in the medium facing surface 12a. $T_{BF}$ falls within the range of 10 to 100 nm, for example. As shown in FIG. 2, the distance between the near-field light generating part 40g of the front end face 40a of the plasmon generator 40 and the front end face 30b of the core 30 is equal to $T_{BF}$.

The dimension of the V-shaped portion 41 of the plasmon generator 40 in the direction perpendicular to the evanescent light generating surface 30c (the Z direction) and that in the track width direction TW (the Y direction) are both sufficiently smaller than the wavelength of the laser light to propagate through the core 30. Two surfaces of the V-shaped portion 41 that are opposite to each other in the track width direction TW form an angle θ (see FIG. 2) in the range of 30 to 120 degrees, for example.

In the medium facing surface 12a, the plasmon generator 40 has a dimension of, for example, 0.1 to 20 µm in the track width direction TW (the Y direction). The dimension of the plasmon generator 40 in the track width direction TW (the Y direction) may be constant regardless of the distance from the medium facing surface 12a, or may become greater at positions away from the medium facing surface 12a than in the medium facing surface 12a.

A portion of the core 30 in the vicinity of the plasmon generator 40 has a width in the track width direction TW (the Y direction) of 0.3 to 1 µm, for example. The remaining portion of the core 30 may have a width greater than that of the portion of the core 30 in the vicinity of the plasmon generator 40. The portion of the core 30 in the vicinity of the plasmon generator 40 has a thickness (dimension in the Z direction) of 0.3 to 0.6 µm, for example.

As shown in FIG. 2, the distance between the near-field light generating part 40g of the front end face 40b of the plasmon generator 40 and the tip 51c of the end face 50a of the magnetic pole 50 will be represented by the symbol D. D falls within the range of 20 to 70 nm, for example.

Reference is now made to FIG. 3 to describe the principle of generation of near-field light in the present embodiment and the principle of thermally-assisted magnetic recording using the near-field light. Laser light 61 emitted from the laser diode 160 propagates through the core 30 of the waveguide to reach the vicinity of the plasmon generator 40. The plasmon generator 40 is configured so that surface plasmons are excited on the plasmon generator 40 based on the light propagating through the core 30 and the near-field light generating part 40g generates near-field light based on the surface plasmons. More specifically, in the core 30, the laser light 61 is totally reflected at the evanescent light generating surface 30c to cause evanescent light 62 to occur from the evanescent light generating surface 30c and permeate into the buffer part 32A. Then, surface plasmons 63 are excited on the plasmon exciting part 40a of the plasmon generator 40 through coupling with the evanescent light 62. The surface plasmons 63 propagate along the plasmon exciting part 40a to the near-field light generating part 40g. Consequently, the surface plasmons 63 concentrate at the near-field light generating part 40g, and the near-field light generating part 40g generates near-field light 64 based on the surface plasmons 63.

The near-field light 64 is projected toward the magnetic disk 201, reaches the surface of the magnetic disk 201 and heats a part of the magnetic recording layer of the magnetic disk 201. This lowers the coercivity of the part of the magnetic recording layer. In thermally-assisted magnetic recording, the part of the magnetic recording layer with the lowered coercivity is subjected to a write magnetic field produced by the magnetic pole 50 for data writing.

Figure 8:
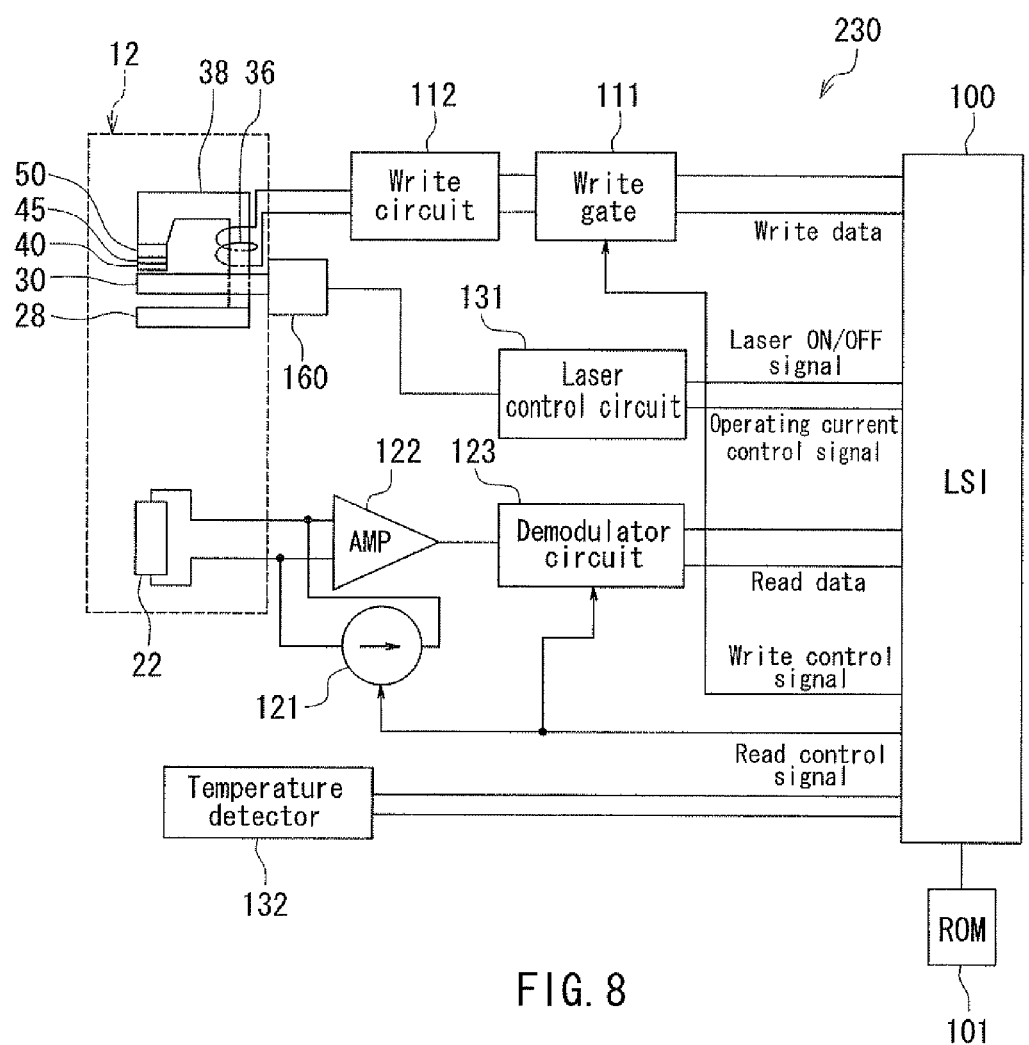
FIG. 8 is a block diagram showing the circuit configuration of the magnetic recording device according to the first embodiment of the invention.

Reference is now made to FIG. 8 to describe the circuit configuration of the control circuit 230 shown in FIG. 4 and the operation of the thermally-assisted magnetic recording head 1. The control circuit 230 includes a control LSI (large scale integrated circuit) 100, a ROM (read only memory) 101 connected to the control LSI 100, a write gate 111 connected to the control LSI 100, and a write circuit 112 connected to the write gate 111 and the coil 36.

The control circuit 230 further includes a constant current circuit 121 connected to the MR element 22 and the control LSI 100, an amplifier 122 connected to the MR element 22, and a demodulator circuit 123 connected to an output of the amplifier 122 and the control LSI 100.

The control circuit 230 further includes a laser control circuit 131 connected to the laser diode 160 and the control LSI 100, and a temperature detector 132 connected to the control LSI 100.

The control LSI 100 supplies write data and a write control signal to the write gate 111. The control LSI 100 supplies a read control signal to the constant current circuit 121 and the demodulator circuit 123, and receives read data output from the demodulator circuit 123. The control LSI 100 supplies a laser ON/OFF signal and an operating current control signal to the laser control circuit 131. The temperature detector 132 detects the temperature of the magnetic recording layer of the magnetic disk 201, and supplies this temperature information to the control LSI 100. The ROM 101 contains a control table and the like for controlling the value of the operating current to be supplied to the laser diode 160.

In a write operation, the control LSI 100 supplies write data to the write gate 111. The write gate 111 supplies the write data to the write circuit 112 only when the write control signal indicates a write operation. According to the write data, the write circuit 112 passes a write current through the coil 36. Consequently, the magnetic pole 50 produces a write magnetic field and data is written on the magnetic recording layer of the magnetic disk 201 through the use of the write magnetic field.

In a read operation, the constant current circuit 121 supplies a certain sense current to the MR element 22 only when the read control signal indicates a read operation. The output voltage of the MR element 22 is amplified by the amplifier 122 and input to the demodulator circuit 123. When the read control signal indicates a read operation, the demodulator circuit 123 demodulates the output of the amplifier 122 to generate read data, and supplies the read data to the control LSI 100.

The laser control circuit 131 controls the supply of the operating current to the laser diode 160 on the basis of the laser ON/OFF signal, and also controls the value of the operating current to be supplied to the laser diode 160 on the basis of the operating current control signal. When the laser ON/OFF signal indicates an ON operation, the laser control circuit 131 exercises control so that an operating current at or above an oscillation threshold is supplied to the laser diode 160. Consequently, the laser diode 160 emits laser light, and the laser light propagates through the core 30. Then, according to the principle of generation of near-field light described previously, the near-field light 64 is generated from the near-field light generating part 40g of the plasmon generator 40. The near-field light 64 heats a part of the magnetic recording layer of the magnetic disk 201, thereby lowering the coercivity of that part. When writing, the part of the magnetic recording layer with the lowered coercivity is subjected to the write magnetic field produced by the magnetic pole 50 for data writing.

On the basis of such factors as the temperature of the magnetic recording layer of the magnetic disk 201 measured by the temperature detector 132, the control LSI 100 consults the control table stored in the ROM 101 to determine the value of the operating current of the laser diode 160. Using the operating current control signal, the control LSI 100 controls the laser control circuit 131 so that the operating current of that value is supplied to the laser diode 160. The control table contains, for example, data that indicates the oscillation threshold and the temperature dependence of the light output versus operating current characteristic of the laser diode 160. The control table may further contain data that indicates the relationship between the operating current value and a temperature increase of the magnetic recording layer heated by the near-field light 64, and data that indicates the temperature dependence of the coercivity of the magnetic recording layer.

As shown in FIG. 8, the control circuit 230 has the signal system for controlling the laser diode 160, i.e., the signal system consisting of the laser ON/OFF signal and the operating current control signal, independent of the control signal system intended for read/write operations. This configuration makes it possible to implement various modes of energization of the laser diode 160, not only to energize the laser diode 160 simply in association with a write operation. It should be noted that the control circuit 230 may have any configuration other than the configuration shown in FIG. 8.

Now, a description will be given of a method of manufacturing the thermally-assisted magnetic recording head 1 according to the present embodiment. The method of manufacturing the thermally-assisted magnetic recording head 1 includes the steps of: manufacturing the slider 10; and securing the light source unit 150 onto the slider 10. The step of manufacturing the slider 10 includes the steps of: forming components of a plurality of sliders 10 except the slider substrates 11 on a substrate that includes portions to become the slider substrates 11 of the plurality of sliders 10, thereby fabricating a substructure including a plurality of pre-slider portions aligned in rows, the plurality of pre-slider portions being intended to become individual sliders 10 later; and forming a plurality of sliders 10 by cutting the substructure to separate the plurality of pre-slider portions from each other. In the step of forming the plurality of sliders 10, the cut surfaces are polished to form the medium facing surfaces 11*a* and 12*a*.

How to form the plasmon generator 40, the amorphous layer 45 and the magnetic pole 50 in the present embodiment will now be described briefly. The following descriptions will be focused on a single pre-slider portion. First, the cladding layer 31, the core 30 and the cladding layer 32 are formed in this order and then the cladding layer 32 is taper-etched by, for example, reactive ion etching, to thereby form the groove 32*b* in the cladding layer 32. Next, a metal film that is to later become the plasmon generator 40 is formed along the top surface 32*a* and the groove 32*b* of the cladding layer 32 by sputtering, for example. The metal film is then partially etched by, for example, ion milling, and thereby patterned. This makes the metal film into the plasmon generator 40.

Next, the amorphous layer 45 is formed on the plasmon generator 40. In the step of forming the amorphous layer 45, the entirety of the amorphous layer 45 can be formed in an amorphous state by employing, for example, sputtering. Using the amorphous layer 45 as an electrode film, the magnetic pole 50 is then formed by frame plating, for example. Then, using the magnetic pole 50 as a mask, the amorphous layer 45 except the portion thereof lying under the magnetic pole 50 is etched by ion milling, for example. The plasmon generator 40, the amorphous layer 45 and the magnetic pole 50 are completed through the series of steps described above.

The function and effects of the thermally-assisted magnetic recording head 1 according to the present embodiment will now be described. The thermally-assisted magnetic recording head 1 according to the present embodiment includes: the medium facing surface 12*a* that faces the magnetic disk 201 having a track; the magnetic pole 50 having the end face 50*a* located in the medium facing surface 12*a*; and the plasmon generator 40 for generating near-field light to be applied to the magnetic disk 201. The plasmon generator 40 and the magnetic pole 50 are disposed to align in the direction of travel of the magnetic disk 201 (the Z direction). In the present embodiment, the magnetic pole 50 is located on the front side, in particular, in the direction of travel of the magnetic disk 201 relative to the plasmon generator 40. The amorphous layer 45 is interposed between and in contact with the plasmon generator 40 and the magnetic pole 50.

Part of the energy of the light guided to the plasmon generator 40 through the core 30 is transformed into heat in the plasmon generator 40. The plasmon generator 40, and the magnetic pole 50 located in its vicinity therefore increase in temperature during the operation of the thermally-assisted magnetic recording head 1. Suppose that the plasmon generator 40 and the magnetic pole 50 are in contact with each other. In this case, the increase in temperature of the plasmon generator 40 and the magnetic pole 50 may cause a noticeable diffusion of substance in the plasmon generator 40 and the magnetic pole 50, and this may cause the materials forming the plasmon generator 40 and the magnetic pole 50 to be diffused into each other. Such diffusion of the materials is mainly caused by diffusion along grain boundaries, that is, grain boundary diffusion.

The occurrence of interdiffusion between the material forming the plasmon generator 40 and the material forming the magnetic pole 50 forces the plasmon generator 40 to receive the material not intended to form the plasmon generator 40. This may reduce the efficiency of transformation of the light that has been guided to the plasmon generator 40 through the core 30 into near-field light. On the other hand, since the magnetic pole 50 is also forced to receive the material not intended to form the magnetic pole 50, the magnetic pole 50 may suffer degradation of its magnetic property and as a result, the characteristics of the write head section 16 may deteriorate.

In contrast to this, in the present embodiment, the plasmon generator 40 and the magnetic pole 50 are not in contact with each other, there being the amorphous layer 45 interposed between and in contact with the plasmon generator 40 and the magnetic pole 50. The amorphous layer 45 has no grain boundary, so that no grain boundary diffusion should occur in the amorphous layer 45. The present embodiment thus makes it possible to prevent interdiffusion between the material forming the plasmon generator 40 and the material forming the magnetic pole 50, and consequently precludes the aforementioned problem resulting from the interdiffusion.

In order for the material forming the amorphous layer 45 to be prevented from diffusing into the plasmon generator 40 and the magnetic pole 50, the material forming the amorphous layer 45 preferably has no tendency of forming a solid solution with the material forming the plasmon generator 40 and the material forming the magnetic pole 50.

On the other hand, if a nonmetallic material layer is interposed between the plasmon generator 40 and the magnetic pole 50 in place of the amorphous layer 45 made of a nonmagnetic metal, it will result in low adhesion between the plasmon generator 40 and the nonmetallic material layer and between the magnetic pole 50 and the nonmetallic material layer. In this case, in the process of manufacturing the thermally-assisted magnetic recording head 1 or when the plasmon generator 40 and the magnetic pole 50 increase in temperature, there may occur a separation between the plasmon generator 40 and the nonmetallic material layer and/or between the magnetic pole 50 and the nonmetallic material layer.

In contrast to this, in the present embodiment, the amorphous layer 45 is made of a nonmagnetic metal. This makes it possible to enhance the adhesion between the plasmon generator 40 and the amorphous layer 45 and the adhesion between the magnetic pole 50 and the amorphous layer 45. Consequently, according to the present embodiment, it is possible to prevent the occurrence of a separation between the plasmon generator 40 and the amorphous layer 45 and a separation between the magnetic pole 50 and the amorphous layer 45 in the process of manufacturing the thermally-assisted magnetic recording head 1 or when the plasmon generator 40 and the magnetic pole 50 increase in temperature.

Now, a description will be given of the results of first to fourth experiments demonstrating the effect of the amorphous layer 45. The first experiment will be described first. The first experiment was carried out on a sample of a first comparative example and a sample of a first practical example described below. The sample of the first comparative example was configured so that a metal layer of Au and a magnetic layer of FeNiCo were stacked in this order on an insulating layer of alumina. The sample of the first practical example was configured so that a metal layer of Au, an amorphous layer of Ta, and a magnetic layer of FeNiCo were stacked in this order on an insulating layer of alumina. The amorphous layer of the sample of the first practical example was 3 nm in thickness. The metal layer, the amorphous layer, and the magnetic layer correspond to the plasmon generator 40, the amorphous layer 45, and the magnetic pole 50, respectively.

In the first experiment, the sample of the first comparative example and the sample of the first practical example were each subjected to heat treatment in a vacuum for two hours. The heat treatment was carried out at a temperature of 400° C. After that, these samples were sliced and the sections thereof were observed with a scanning electron microscope (SEM).

Figure 9A:
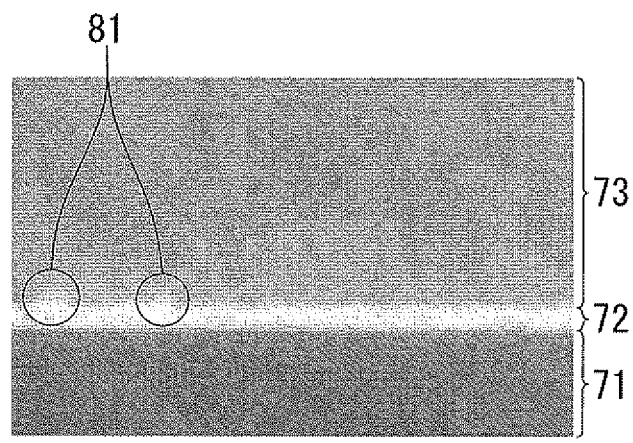
FIG. 9A and FIG. 9B each show an image of part of a section of a sample of a first experiment which was taken with an SEM.
Figure 9B:
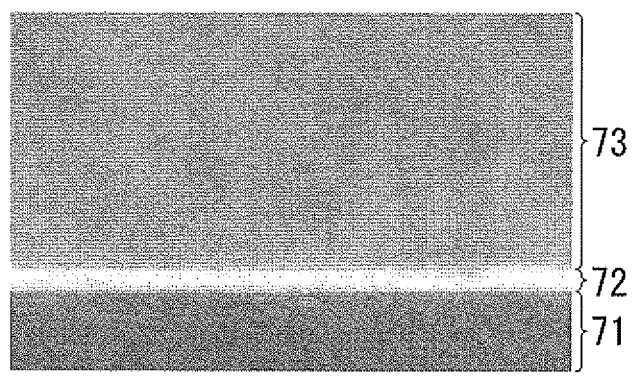

FIG. 9A and FIG. 9B show the images of respective parts of the sections of the samples which were taken with the SEM in the first experiment. FIG. 9A shows the sample of the first comparative example, and FIG. 9B shows the sample of the first practical example. In each of FIG. 9A and FIG. 9B, the portion denoted by reference numeral 71 represents the insulating layer, the portion denoted by reference numeral 72 represents the metal layer, and the portion denoted by reference numeral 73 represents the magnetic layer. On the images shown in FIG. 9A and FIG. 9B, the material forming the insulating layer 71, the material forming the metal layer 72, and the material forming the magnetic layer 73 can be distinguished from each other by the level of contrast. Hereinafter, in relation to these images, the portion representing the material forming the insulating layer 71 will be expressed as the black portion, the portion representing the material forming the metal layer 72 will be expressed as the white portion, and the portion representing the material forming the magnetic layer 73 will be expressed as the grey portion. On the image shown in FIG. 9B, the amorphous layer and the metal layer 72 cannot be distinguished from each other. In FIG. 9A, in the portion in the circle denoted by reference numeral 81, the white portion representing the material forming the metal layer 72 is found in the magnetic layer 73. On the other hand, such a phenomenon is not observed in FIG. 9B.

The results of the first experiment show that the provision of the amorphous layer between the metal layer 72 and the magnetic layer 73 makes it possible to prevent interdiffusion between the material forming the metal layer 72 and the material forming the magnetic layer 73.

The second experiment will now be described. The second experiment was carried out on a sample of a second comparative example and samples of second and third practical examples described below. The sample of the second comparative example was configured so that a metal layer 72 of Au, a magnetic layer 73 of FeCo, and an insulating layer 74 of alumina were stacked in this order on an insulating layer 71 of alumina. The samples of the second and third practical examples are each configured so that a metal layer 72 of Au, an amorphous layer of Ta, a magnetic layer 73 of FeCo, and an insulating layer 74 of alumina were stacked in this order on an insulating layer 71 of alumina. The amorphous layer of the sample of the second practical example was 3 nm in thickness, and the amorphous layer of the sample of the third practical example was 6 nm in thickness.

In the second experiment, the sample of the second comparative example and the samples of the second and third practical examples were each subjected to heat treatment in air for two hours. The heat treatment was carried out at a temperature of 300° C. After that, the side surfaces of these samples on which the aforementioned multiple layers appeared were observed with the SEM.

Figure 10A:
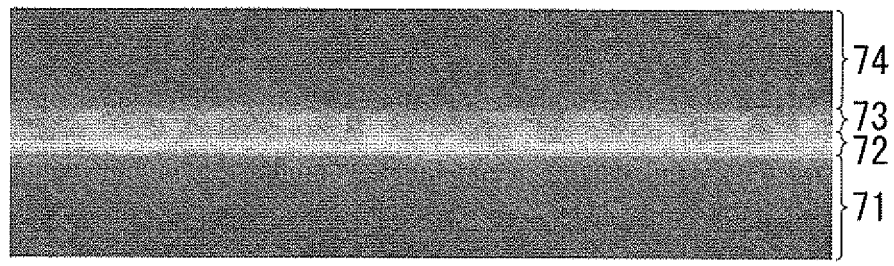
FIG. 10A to FIG. 10C each show an image of part of a side surface of a sample of a second experiment which was taken with the SEM.
Figure 10B:
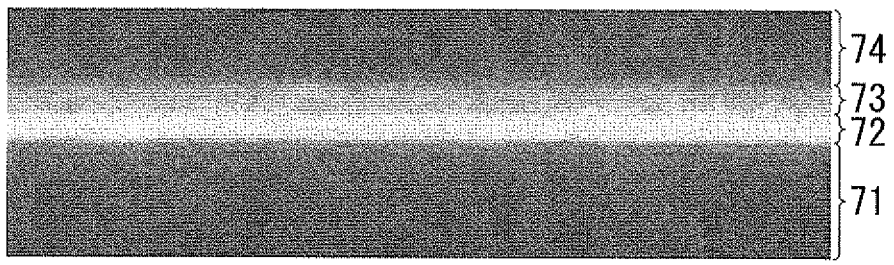
Figure 10C:
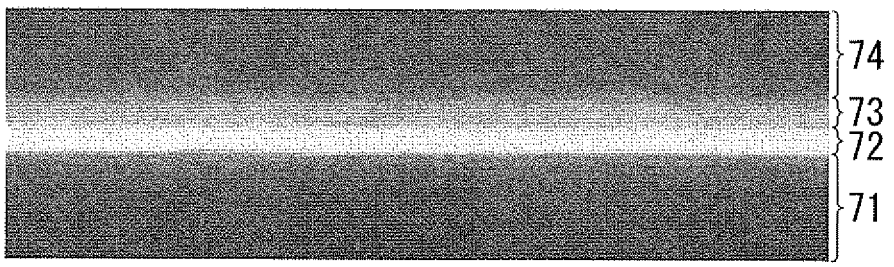

FIG. 10A to FIG. 10C show the images of respective parts of the side surfaces of the samples which were taken with the SEM in the second experiment. FIG. 10A shows the sample of the second comparative example, FIG. 10B shows the sample of the second practical example, and FIG. 10C shows the sample of the third practical example. On the images shown in FIG. 10B and FIG. 10C, the amorphous layer and the metal layer 72 cannot be distinguished from each other. FIG. 10A shows that the white portion representing the material forming the metal layer 72 is found in the magnetic layer 73, and the grey portion representing the material forming the magnetic layer 73 is found in the metal layer 72. On the other hand, such a phenomenon is hardly observed in FIG. 10B and FIG. 10C.

Like the first experiment, the second experiment also shows that the provision of the amorphous layer between the metal layer 72 and the magnetic layer 73 makes it possible to prevent interdiffusion between the material forming the metal layer 72 and the material forming the magnetic layer 73.

Furthermore, a comparison between FIG. 10B and FIG. 10C shows that the boundary between the metal layer 72 and the magnetic layer 73 is clearer in FIG. 10C than in FIG. 10B. This teaches that the greater the thickness of the amorphous layer, the more noticeable the aforementioned effect of the amorphous layer becomes.

Now, the third and fourth experiments will be described. The third and fourth experiments were carried out on samples of fourth to sixth practical examples described below. The configuration of each of the samples of the fourth to sixth practical examples is the same as that of the sample of the second or third practical example of the second experiment except for the thickness of the amorphous layer. For the third and fourth experiments, the thickness of the amorphous layer was set to 1 nm for the sample of the fourth practical example, 3 nm for the sample of the fifth practical example, and 6 nm for the sample of the sixth practical example.

In the third experiment, the samples of the fourth to sixth practical examples were each subjected to heat treatment in air for two hours. The heat treatment was carried out at a temperature of 400° C. After that, these samples were sliced and the sections thereof were observed with the SEM.

In the fourth experiment, the samples of the fourth to sixth practical examples were each subjected to heat treatment in a vacuum for two hours. The heat treatment was carried out at a temperature of 400° C. After that, these samples were sliced and the sections thereof were observed with the SEM.

Figure 11A:
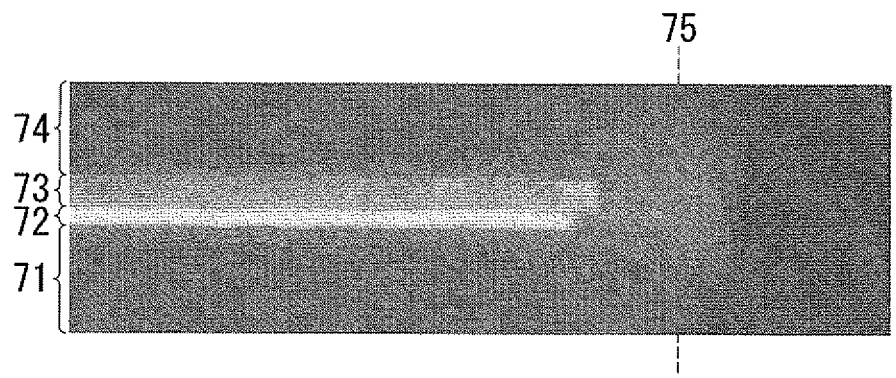
FIG. 11A to FIG. 11C each show an image of part of a section of a sample of a third experiment which was taken with the SEM.
Figure 11B:
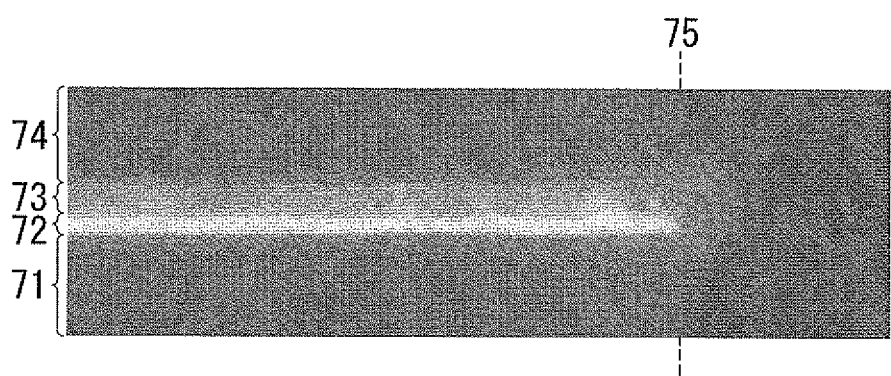
Figure 11C:
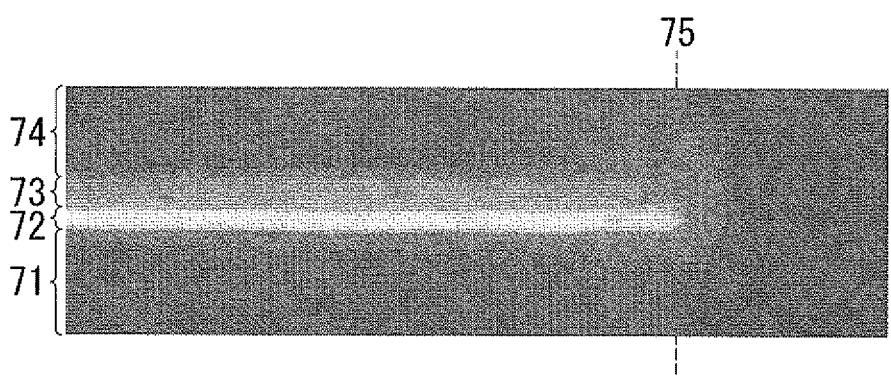
Figure 12A:
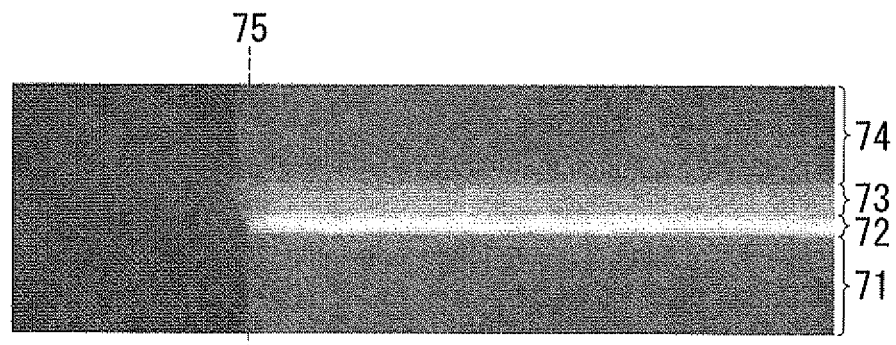
FIG. 12A to FIG. 12C each show an image of part of a section of a sample of a fourth experiment which was taken with the SEM.
Figure 12B:
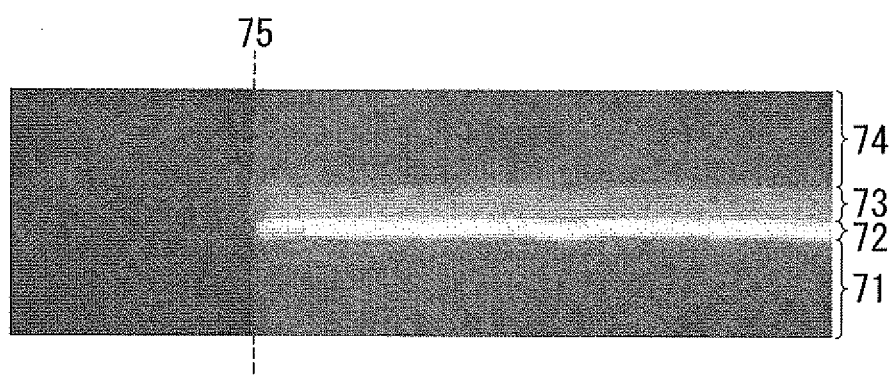
Figure 12C:
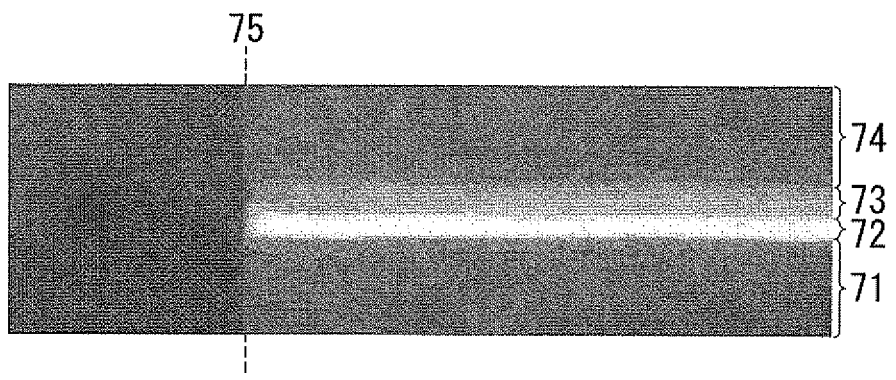

FIG. 11A to FIG. 11C show the images of respective parts of the sections of the samples which were taken with the SEM in the third experiment. FIG. 12A to FIG. 12C show the images of respective parts of the sections of the samples which were taken with the SEM in the fourth experiment. FIG. 11A and FIG. 12A show the sample of the fourth practical example, FIG. 11B and FIG. 12B show the sample of the fifth practical example, and FIG. 11C and FIG. 12C show the sample of the sixth practical example. On the images shown in FIG. 11A to FIG. 12C, the amorphous layer and the metal layer 72 cannot be distinguished from each other. In FIG. 11A to FIG. 12C, reference numeral 75 indicates the position of the side surface of each sample. FIG. 11A, FIG. 11B and FIG. 12A show that the white portion representing the material forming the metal layer 72 is found in a slight amount in the magnetic layer 73. On the other hand, in FIG. 11C, FIG. 12B and FIG. 12C, the white portion representing the material forming the metal layer 72 is hardly found in the magnetic layer 73. Like the second experiment, the third experiment also shows that the greater the thickness of the amorphous layer, the more noticeable the previously mentioned effect of the amorphous layer becomes.

The results of the first to third experiments described above show that the provision of the amorphous layer 45 between the plasmon generator 40 and the magnetic pole 50 as in the present embodiment makes it possible to prevent interdiffusion between the material forming the plasmon generator 40 and the material forming the magnetic pole 50.

Now, the preferable thickness range of the amorphous layer 45 will be described. As is clear from the second to fourth experiments, the greater the thickness of the amorphous layer 45, the more noticeable the aforementioned effect of the amorphous layer 45 becomes. However, an increase in the thickness of the amorphous layer 45 results in an increase in the distance D (see FIG. 2) between the near-field light generating part 40g of the front end face 40b of the plasmon generator 40 and the tip 51c of the end face 50a of the magnetic pole 50. For thermally-assisted magnetic recording, it is necessary that the position of occurrence of the near-field light and the position of occurrence of the write magnetic field be in close proximity to each other. It is thus required that the distance D be not excessively increased. The amorphous layer 45 preferably has a thickness of 6 nm or less so that the distance D is not excessively increased.

Furthermore, a comparison between the second comparative example of the second experiment (see FIG. 10A) and the fourth practical example of the third and fourth experiments (see FIG. 11A and FIG. 12A) clearly shows that the aforementioned effect of the amorphous layer was exhibited even in the fourth practical example in which the amorphous layer was 1 nm in thickness. Accordingly, the amorphous layer 45 preferably has a thickness of 1 nm or greater. More preferably, the amorphous layer 45 has a thickness of 3 nm or greater so that the aforementioned effect of the amorphous layer 45 becomes noticeable. In view of the foregoing, the thickness of the amorphous layer 45 is preferably in the range of 1 to 6 nm and more preferably in the range of 3 to 6 nm.

Second Embodiment

Figure 13:
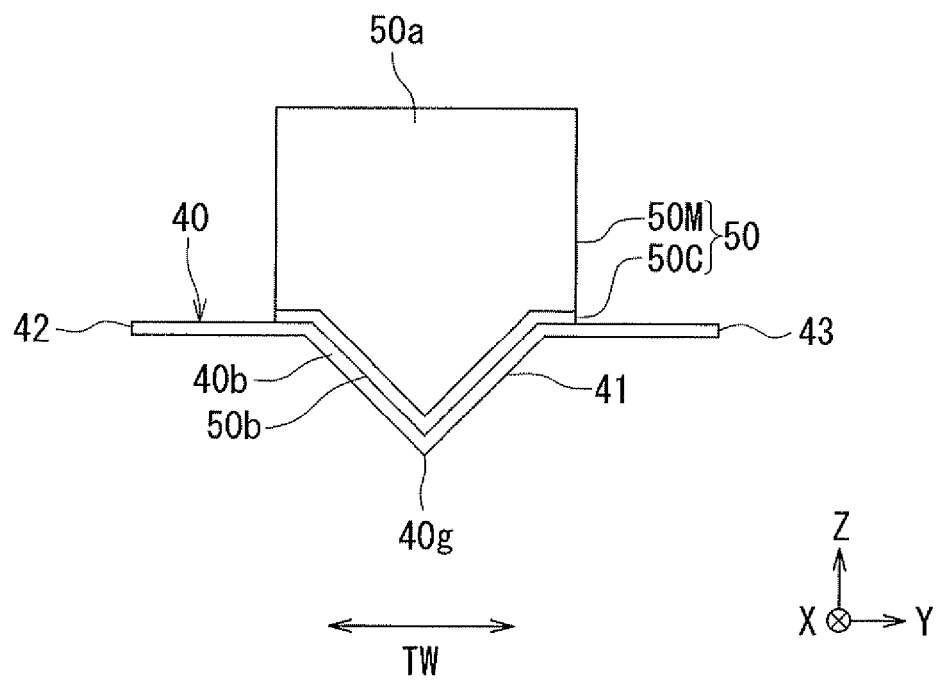
FIG. 13 is a front view showing the main part of a thermally-assisted magnetic recording head according to a second embodiment of the invention.

A second embodiment of the present invention will now be described with reference to FIG. 13. FIG. 13 is a front view showing the plasmon generator and the magnetic pole of the present embodiment. The thermally-assisted magnetic recording head 1 according to the present embodiment is without the amorphous layer 45 of the first embodiment shown in FIG. 1 to FIG. 3.

In the present embodiment, the magnetic pole 50 has an end face 50a located in the medium facing surface 12a and a contact surface 50b in contact with the plasmon generator 40. The magnetic pole 50 includes an amorphous portion 50C and a main portion 50M. The amorphous portion 50C includes the contact surface 50b. The main portion 50M is located farther from the evanescent light generating surface 30c (see FIG. 2) of the core 30 than is the amorphous portion 50C. In the present embodiment, the amorphous portion 50C has a shape similar to that of the amorphous layer 45 of the first embodiment. The main portion 50M has a shape similar to the shape of a combination of the first portion 51 and the second portion 52 of the magnetic pole 50 of the first embodiment.

The amorphous portion 50C is made of an amorphous magnetic metal. The material of the amorphous portion 50C may be CoCr, TbFeCo, CoFeB, CoZrTa, or CoZrNb, for example. The main portion 50M is made of a magnetic metal material. The main portion 50M may be either crystalline or amorphous.

The amorphous portion 50C has the same function as that of the amorphous layer 45 which has been described in relation to the first embodiment. According to the present embodiment, it is therefore possible to prevent interdiffusion between the plasmon generator 40 and the main portion 50M. Like the amorphous layer 45, the amorphous portion 50C having such a function can be formed by, for example, sputtering. In the case of forming the main portion 50M by frame plating, for example, the amorphous portion 50C can be used as an electrode film.

The remainder of configuration, function and effects of the present embodiment are similar to those of the first embodiment.

Third Embodiment

Figure 14:
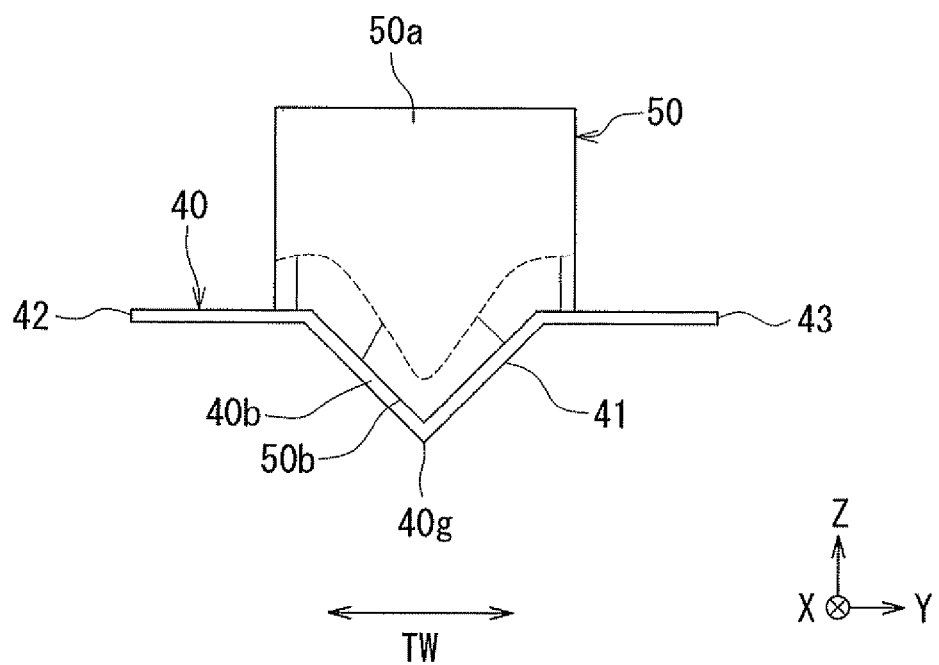
FIG. 14 is a front view showing the main part of a thermally-assisted magnetic recording head according to a third embodiment of the invention.

Reference is now made to FIG. 14 to describe a magnetic disk drive that functions as a magnetic recording device according to a third embodiment of the invention. FIG. 14 is a front view showing the plasmon generator and the magnetic pole of the present embodiment. In the magnetic disk drive according to the present embodiment, the thermally-assisted magnetic recording head 1 differs from that of the first embodiment in the following respects only. In the present embodiment, the thermally-assisted magnetic recording head 1 is without the amorphous layer 45, and the magnetic pole 50 has the end face 50a and the contact surface 50b as in the second embodiment. The magnetic pole 50 has a shape similar to that of the main portion 50M of the second embodiment.

In the present embodiment, all or a part of the magnetic pole 50 including the contact surface 50b has a grain size greater than the effective track width of the track. This will be described in detail below. First, the effective track width will be described. The effective track width is the full width at half maximum of the read waveform in the track width direction TW. The read waveform in the track width direction TW can be created by varying the position of the thermally-assisted magnetic recording head 1 in the track width direction TW and determining the read output at each position. The effective track width in the present embodiment is in the range of 50 to 100 nm, for example.

The grain size will now be described. In the present embodiment, the grain size of the magnetic pole 50 is defined in the following manner. First, the end face 50a of the magnetic pole 50 is observed with a transmission electron microscope (TEM). In FIG. 14, the thin lines drawn on the end face 50a schematically show the grain boundaries observed with the TEM. In the example shown in FIG. 14, observed with the TEM was the region from the boundary line between the end face 50a and the front end face 40b of the plasmon generator 40 to the dashed curve. Next, the number of crystal grains that are in contact with a line of a predetermined length that includes part or the whole of the aforementioned boundary line is counted. Then, the aforementioned predetermined length divided by the number of the crystal grains is defined as the grain size. The aforementioned predetermined length is, for example, twice or more the effective track width and in the range of 50% to 100% of the length of the aforementioned boundary line.

Now, first and second forming methods for the magnetic pole 50 of the present embodiment will be described. The first forming method is to form the magnetic pole 50 by plating. The plating film to form the magnetic pole 50 may be subjected to heat treatment. In the first forming method, the deposition conditions, the material composition, the heat treatment conditions and the like for the plating film are optimized to thereby make the grain size of the plating film greater than the effective track width.

The second forming method is that an electrode film to make a part of the magnetic pole 50 is first formed by, for example, sputtering, and then a plating film to make another part of the magnetic pole 50 is formed by plating. The electrode film may be subjected to heat treatment. In the second forming method, the deposition conditions, the material composition, the heat treatment conditions and the like for the electrode film are optimized to thereby make the grain size of the electrode film greater than the effective track width.

The effects of the present embodiment will now be described. When the plasmon generator 40 generates near-field light from the near-field light generating part 40g, a specific region of the medium facing surface 12a in the vicinity of the near-field light generating part 40g particularly increases in temperature. This region will hereinafter be referred to as the high-temperature region. In the high-temperature region, there occurs noticeable diffusion of substance. The size of a region in the medium facing surface 12a that increases in temperature is nearly equal to the size of the aforementioned high-temperature region. The effective track width is nearly equal to the width of the aforementioned high-temperature region. As described above, in the present embodiment, all or a part of the magnetic pole 50 including the contact surface 50b has a grain size greater than the effective track width of the track. Therefore, there will be a very low possibility of existence of grain boundaries in a portion of the end face 50a of the magnetic pole 50 that is included in the aforementioned high-temperature region, so that only one would exist, if any. Thus, according to the present embodiment, it is possible to prevent interdiffusion between the material forming the plasmon generator 40 and the material forming the magnetic pole 50 induced by grain boundary diffusion.

The remainder of configuration, function and effects of the present embodiment are similar to those of the first or second embodiment.

The present invention is not limited to the foregoing embodiments, and various modifications may be made thereto. For example, as far as the requirements of the appended claims are met, the shapes and the arrangement of the plasmon generator, the amorphous layer and the magnetic pole are not limited to the examples illustrated in the foregoing embodiments, and can be arbitrarily chosen. Furthermore, the magnetic pole may be located on the rear side in the direction of travel of the magnetic recording medium relative to the plasmon generator.

It is apparent that the present invention can be carried out in various forms and modifications in the light of the foregoing descriptions. Accordingly, within the scope of the following claims and equivalents thereof, the present invention can be carried out in forms other than the foregoing most preferable embodiments.

What is claimed is:

1. A thermally-assisted magnetic recording head comprising:
    a medium facing surface that faces a magnetic recording medium;
    a magnetic pole that has an end face located in the medium facing surface and produces a write magnetic field for writing data on the magnetic recording medium;
    a waveguide including a core and a cladding, the core allowing light to propagate therethrough; and
    a plasmon generator, wherein:
    the plasmon generator has a near-field light generating part located in the medium facing surface, and is configured so that a surface plasmon is excited on the plasmon generator based on the light propagating through the core and the near-field light generating part generates near-field light based on the surface plasmon; and
    the plasmon generator and the magnetic pole are disposed to align in a direction of travel of the magnetic recording medium,
    the thermally-assisted magnetic recording head further comprising an amorphous layer made of a nonmagnetic metal, the amorphous layer being interposed between and in contact with the plasmon generator and the magnetic pole.

2. The thermally-assisted magnetic recording head according to claim 1, wherein:
    the core has an evanescent light generating surface that generates evanescent light based on the light propagating through the core;
    the plasmon generator has a plasmon exciting part that faces the evanescent light generating surface with a predetermined spacing therebetween; and
    the plasmon generator is configured so that the surface plasmon is excited on the plasmon exciting part through coupling with the evanescent light generated from the evanescent light generating surface, the surface plasmon propagates to the near-field light generating part, and the near-field light generating part generates the near-field light based on the surface plasmon.

3. The thermally-assisted magnetic recording head according to claim 1, wherein the magnetic pole is located on a front side in the direction of travel of the magnetic recording medium relative to the plasmon generator.

4. The thermally-assisted magnetic recording head according to claim 1, wherein:
    the plasmon generator has a front end face located in the medium facing surface, the front end face including a first portion and a second portion connected to each other into a V-shape; and
    the end face of the magnetic pole includes a portion enclosed by the first and second portions of the front end face.

5. A head gimbal assembly comprising the thermally-assisted magnetic recording head according to claim 1, and a suspension that supports the thermally-assisted magnetic recording head.

6. A magnetic recording device comprising: a magnetic recording medium; the thermally-assisted magnetic recording head according to claim 1; and a positioning device that supports the thermally-assisted magnetic recording head and positions the thermally-assisted magnetic recording head with respect to the magnetic recording medium.

7. A thermally-assisted magnetic recording head comprising:
- a medium facing surface that faces a magnetic recording medium;
- a magnetic pole that has an end face located in the medium facing surface and produces a write magnetic field for writing data on the magnetic recording medium;
- a waveguide including a core and a cladding, the core allowing light to propagate therethrough; and
- a plasmon generator, wherein:
- the plasmon generator has a near-field light generating part located in the medium facing surface, and is configured so that a surface plasmon is excited on the plasmon generator based on the light propagating through the core and the near-field light generating part generates near-field light based on the surface plasmon;
- the plasmon generator and the magnetic pole are disposed to align in a direction of travel of the magnetic recording medium;
- the magnetic pole has a contact surface in contact with the plasmon generator; and
- all or a part of the magnetic pole including the contact surface is made of an amorphous magnetic metal.

8. The thermally-assisted magnetic recording head according to claim 7, wherein:
- the core has an evanescent light generating surface that generates evanescent light based on the light propagating through the core;
- the plasmon generator has a plasmon exciting part that faces the evanescent light generating surface with a predetermined spacing therebetween; and
- the plasmon generator is configured so that the surface plasmon is excited on the plasmon exciting part through coupling with the evanescent light generated from the evanescent light generating surface, the surface plasmon propagates to the near-field light generating part, and the near-field light generating part generates the near-field light based on the surface plasmon.

9. The thermally-assisted magnetic recording head according to claim 7, wherein the magnetic pole is located on a front side in the direction of travel of the magnetic recording medium relative to the plasmon generator.

10. The thermally-assisted magnetic recording head according to claim 7, wherein:
- the plasmon generator has a front end face located in the medium facing surface, the front end face including a first portion and a second portion connected to each other into a V-shape; and
- the end face of the magnetic pole includes a portion enclosed by the first and second portions of the front end face.

11. A head gimbal assembly comprising the thermally-assisted magnetic recording head according to claim 7, and a suspension that supports the thermally-assisted magnetic recording head.

12. A magnetic recording device comprising: a magnetic recording medium; the thermally-assisted magnetic recording head according to claim 7; and a positioning device that supports the thermally-assisted magnetic recording head and positions the thermally-assisted magnetic recording head with respect to the magnetic recording medium.

13. A magnetic recording device comprising: a magnetic recording medium having a track which is an area on which data is to be written; and a thermally-assisted magnetic recording head for writing the data on the magnetic recording medium,
- the thermally-assisted magnetic recording head comprising:
- a medium facing surface that faces the magnetic recording medium;
- a magnetic pole that has an end face located in the medium facing surface and produces a write magnetic field for writing the data on the magnetic recording medium;
- a waveguide including a core and a cladding, the core allowing light to propagate therethrough; and
- a plasmon generator, wherein:
- the plasmon generator has a near-field light generating part located in the medium facing surface, and is configured so that a surface plasmon is excited on the plasmon generator based on the light propagating through the core and the near-field light generating part generates near-field light based on the surface plasmon;
- the plasmon generator and the magnetic pole are disposed to align in a direction of travel of the magnetic recording medium;
- the magnetic pole has a contact surface in contact with the plasmon generator; and
- all or a part of the magnetic pole including the contact surface has a grain size greater than an effective track width of the track.

14. The magnetic recording device according to claim 13, wherein:
- the core has an evanescent light generating surface that generates evanescent light based on the light propagating through the core;
- the plasmon generator has a plasmon exciting part that faces the evanescent light generating surface with a predetermined spacing therebetween; and
- the plasmon generator is configured so that the surface plasmon is excited on the plasmon exciting part through coupling with the evanescent light generated from the evanescent light generating surface, the surface plasmon propagates to the near-field light generating part, and the near-field light generating part generates the near-field light based on the surface plasmon.

15. The magnetic recording device according to claim 13, wherein the magnetic pole is located on a front side in the direction of travel of the magnetic recording medium relative to the plasmon generator.

16. The magnetic recording device according to claim 13, wherein:
- the plasmon generator has a front end face located in the medium facing surface, the front end face including a first portion and a second portion connected to each other into a V-shape; and
- the end face of the magnetic pole includes a portion enclosed by the first and second portions of the front end face.

* * * * *